(12) United States Patent
Hirosawa et al.

(10) Patent No.: US 11,199,351 B2
(45) Date of Patent: Dec. 14, 2021

(54) AIR CONDITIONER AND METHOD FOR CONTROLLING OPERATION OF AIR CONDITIONER

(71) Applicant: Mitsubishi Electric Corporation, Tokyo (JP)

(72) Inventors: Yuji Hirosawa, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 63 days.

(21) Appl. No.: 16/496,755

(22) PCT Filed: May 10, 2017

(86) PCT No.: PCT/JP2017/017650
§ 371 (c)(1),
(2) Date: Sep. 23, 2019

(87) PCT Pub. No.: WO2018/207275
PCT Pub. Date: Nov. 15, 2018

(65) Prior Publication Data
US 2020/0056821 A1 Feb. 20, 2020

(51) Int. Cl.
*F25B 49/02* (2006.01)
*F25B 13/00* (2006.01)

(52) U.S. Cl.
CPC ............ *F25B 49/022* (2013.01); *F25B 13/00* (2013.01)

(58) Field of Classification Search
CPC .................... F25B 49/022; F25B 13/00; F25B 2700/2104; F25B 31/006; F25B 2600/021; Y02B 30/70
See application file for complete search history.

(56) References Cited

U.S. PATENT DOCUMENTS 4,467,616 A * 8/1984 Kitauchi ................ G05D 23/20
62/175

FOREIGN PATENT DOCUMENTS

| JP | H07-019695 A | | 1/1995 |
| JP | H07-035455 A | | 2/1995 |
| JP | 2006246674 A | * | 9/2006 |
| JP | 2009-216324 A | | 9/2009 |

(Continued)

OTHER PUBLICATIONS

Oikawa et al., Apparatus and Method for Driving Motor and Compressor, Sep. 14, 2006, JP2006246674A, Whole Document (Year: 2006).*

(Continued)

*Primary Examiner* — Larry L Furdge
(74) *Attorney, Agent, or Firm* — Posz Law Group, PLC

(57) ABSTRACT

An air conditioner includes a compressor having a compressor motor including coils, an indoor fan having a fan motor, a connection switching unit that switches a connection state of the coils between a first connection state and a second connection state in which a line voltage is lower than a line voltage in the first connection state, and a controller that controls the compressor motor, the fan motor, and the connection switching unit. The controller provides a stop period during which rotation of the compressor motor stops before the connection switching unit switches the connection state of the coils, and rotates the fan motor for at least a time period within the stop period.

13 Claims, 16 Drawing Sheets

(56) References Cited

FOREIGN PATENT DOCUMENTS

| JP | 2010-144958 A | | 7/2010 |
|----|---------------|---|--------|
| JP | 2012-029416 A | | 2/2012 |
| JP | 2012072939 A | * | 4/2012 |
| JP | 2013050239 A | * | 3/2013 |
| JP | 2016-085005 A | | 5/2016 |

OTHER PUBLICATIONS

Seki et al., Air Conditioner, Mar. 14, 2013, JP2013050239A, Whole Document (Year: 2013).*
Yanagi et al., Cooling Device, Apr. 12, 2014, JP2012072939A, Whole Document (Year: 2012).*
International Search Report of the International Searching Authority dated Aug. 1, 2017 for the corresponding International application No. PCT/JP2017/017650 (and English translation).

* cited by examiner ns351 B2

AIR CONDITIONER AND METHOD FOR CONTROLLING OPERATION OF AIR CONDITIONER

CROSS REFERENCE TO RELATED APPLICATION

This application is a U.S. national stage application of International Patent Application No. PCT/JP2017/017650 filed on May 10, 2017, the disclosure of which is incorporated herein by reference.

TECHNICAL FIELD

The present invention relates to an air conditioner and a method for controlling an operation of the air conditioner.

BACKGROUND

In an air conditioner, a connection state of coils in a compressor motor is switched between a Y connection (star connection) and a delta connection (also referred to as A connection) in order to enhance operation efficiency of a compressor when the compressor rotates at a low speed and when the compressor rotates at a high speed.

Switching of the connection states of the coils is performed in a state where the compressor motor stops, in consideration of reliability or the like of a device (see, for example, Patent Reference 1).

PATENT REFERENCE

Patent Reference 1: Japanese Patent Application Publication No. 2009-216324 (see paragraphs 0027-0039).

However, since the compressor motor stops when the connection state of the coils is switched, an operation of the air conditioner is temporarily stopped, and thus user comfort may be reduced.

SUMMARY

The present invention is intended to solve the above described problem, and an object of the present invention is to provide an air conditioner and a method for controlling an operation of the air conditioner capable of suppressing reduction in comfort.

An air conditioner of the present invention includes a compressor having a compressor motor having coils, an indoor fan having a fan motor, a connection switching unit to switch a connection state of the coils between a first connection state and a second connection state in which a line voltage is lower than a line voltage in the first connection state, and a controller to control the compressor motor, the fan motor, and the connection switching unit. The controller provides a stop period during which rotation of the compressor motor stops before the connection switching unit switches the connection state of the coils, and causes the fan motor to rotate for at least a time period within the stop period.

According to the present invention, the fan motor rotates for at least a time period within the stop period during which driving of the compressor motor is stopped. Thus, reduction in comfort can be suppressed by air blowing by the fan.

DETAILED DESCRIPTION

First Embodiment (Configuration of Air Conditioner)

Figure 1:
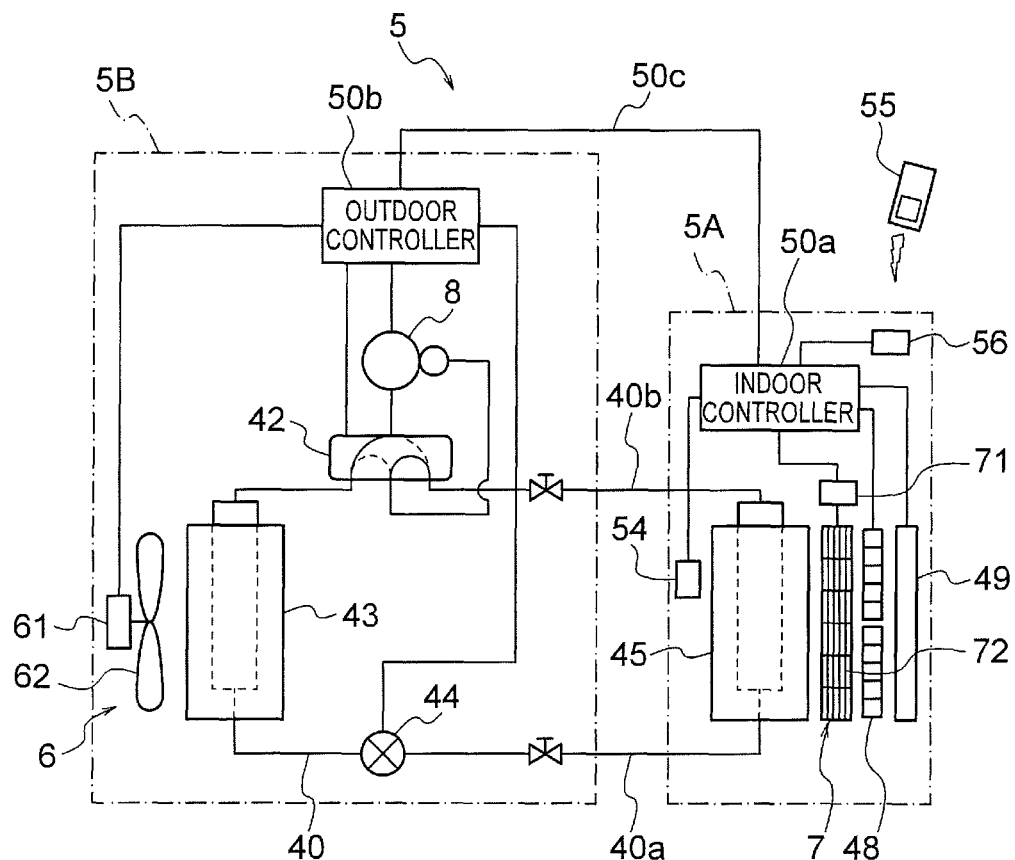
FIG. 1 is a block diagram showing a configuration of an air conditioner of a first embodiment.

First, an air conditioner 5 of a first embodiment of the present invention will be described. FIG. 1 is a block diagram showing a configuration of the air conditioner 5. The air conditioner 5 includes an indoor unit 5A installed in a room (space to be air-conditioned) and an outdoor unit 5B installed outside the room. The indoor unit 5A and the outdoor unit 5B are connected by connection pipes 40a and 40b through which refrigerant flows. Liquid refrigerant passing through a condenser flows through the connection pipe 40a. Gas refrigerant passing through an evaporator flows through the connection pipe 40b.

The outdoor unit 5B is provided with a compressor 8 that compresses and discharges refrigerant, a four-way valve (refrigerant flow path switching valve) 42 that switches a flow direction of the refrigerant, an outdoor heat exchanger 43 that exchanges heat between outside air and the refrigerant, and an expansion valve (decompressor) 44 that reduces pressure of the high-pressure refrigerant to a low pressure. The compressor 8 is constituted by, for example, a rotary compressor shown in FIG. 4. In the indoor unit 5A, an indoor heat exchanger 45 that performs heat exchange between indoor air and the refrigerant is disposed.

The compressor 8, the four-way valve 42, the outdoor heat exchanger 43, the expansion valve 44, and the indoor heat exchanger 45 are connected by a pipe 40 including the above described connection pipes 40a and 40b, and constitute a refrigerant circuit. These components constitute a compression refrigeration cycle (compression heat pump cycle) in which the refrigerant circulates.

In order to control an operation of the air conditioner 5, an indoor controller 50a is disposed in the indoor unit 5A, and an outdoor controller 50b is disposed in the outdoor unit 5B. Each of the indoor controller 50a and the outdoor controller 50b has a control board on which various circuits for controlling the air conditioner 5 are formed. The indoor controller 50a and the outdoor controller 50b are connected to each other by a communication cable 50c. The communication cable 50c is bundled together with the above described connection pipes 40a and 40b, for example.

In the outdoor unit 5B, an outdoor fan 6 which is a blower is disposed to face the outdoor heat exchanger 43. The outdoor fan 6 includes an impeller 62 and an outdoor fan motor 61 that rotates the impeller 62. The impeller 62 is constituted by, for example, a propeller fan. By air blowing by the outdoor fan 6, an air flow passing through the outdoor heat exchanger 43 is generated.

The four-way valve 42 is controlled by the outdoor controller 50b, and switches the flow direction of the refrigerant. When the four-way valve 42 is in a position indicated by a solid line in FIG. 1, gas refrigerant discharged from the compressor 8 is sent to the outdoor heat exchanger 43 (condenser). When the four-way valve 42 is in a position indicated by a broken line in FIG. 1, gas refrigerant flowing from the outdoor heat exchanger 43 (evaporator) is sent to the compressor 8. The expansion valve 44 is controlled by the outdoor controller 50b, and changes its opening degree to reduce the pressure of the high pressure refrigerant to a low pressure.

In the indoor unit 5A, an indoor fan 7 which is a blower is disposed to face the indoor heat exchanger 45. The indoor fan 7 includes an impeller 72 and an indoor fan motor 71 (fan motor) that rotates the impeller 72. The impeller 72 is constituted by, for example, a crossflow fan. By air blowing by the indoor fan 7, an air flow passing through the indoor heat exchanger 45 is generated, and air (conditioned air) subjected to heat exchange in the indoor heat exchanger 45 is supplied to the room.

The indoor unit 5A is provided with an indoor temperature sensor 54 as a temperature sensor. The indoor temperature sensor 54 measures an indoor temperature Ta that is a temperature of indoor air, and transmits the measured temperature information (information signal) to the indoor controller 50a. The indoor temperature sensor 54 may be constituted by a temperature sensor which is used in a general air conditioner. Alternatively, a radiant temperature sensor that detects a surface temperature of a wall, a floor, or the like in the room may be used.

The indoor unit 5A is further provided with a signal receiver 56. The signal receiver 56 receives an instruction signal (operation instruction signal) transmitted from a remote controller 55 as an operation device operated by a user. The remote controller 55 is used by the user to give the air conditioner 5 instructions of operation inputs (start and stop of operation), operation modes (cooling, heating, or the like), and operation content (set temperature, wind speed, or the like). The remote controller 55 corresponds to a temperature setting part for setting an indoor temperature Ta (set temperature). In this regard, setting of the indoor temperature Ta is not limited to setting by the remote controller 55, and the indoor temperature Ta may be set by the indoor controller 50a based on the operation mode, the operation content, or the like.

Figure 5:
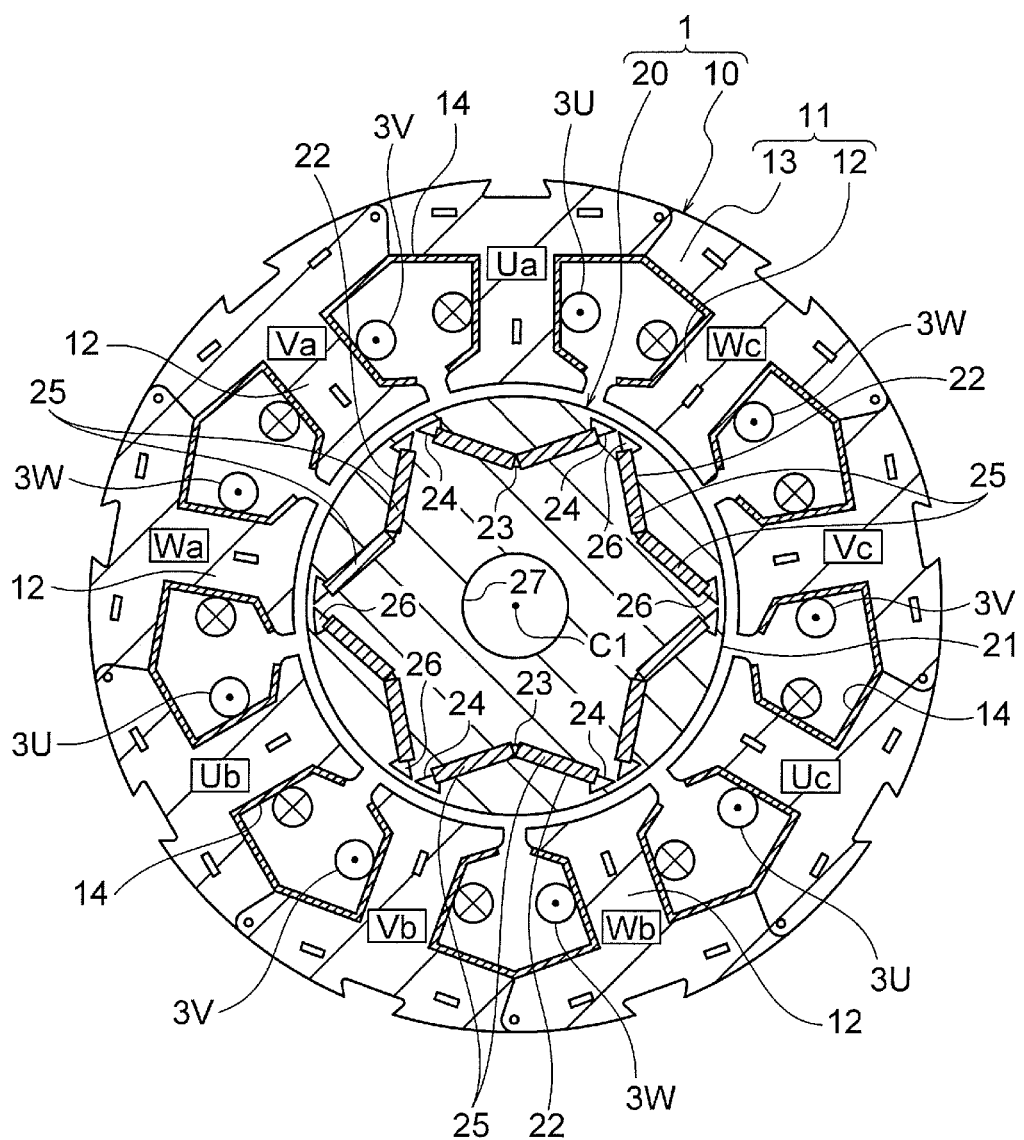
FIG. 5 is a sectional view showing the compressor motor of the first embodiment.

The compressor 8 has a compressor motor 1 (FIG. 5). The compressor 8 is configured to be capable of changing a rotation speed in a range of 20 to 130 rps during a normal operation. An amount of refrigerant circulating in the refrigerant circuit increases, as the rotation speed of the compressor 8 increases. The rotation speed of the compressor 8 is controlled by a controller 50 (more specifically, the outdoor controller 50b) according to a temperature difference $\Delta T$ between the indoor temperature Ta detected by the indoor temperature sensor 54 and a set temperature Ts set by the user with the remote controller 55. As the temperature difference $\Delta T$ increases, the compressor 8 rotates at a higher rotation speed, and thus the circulating amount of the refrigerant increases.

Rotation of the indoor fan 7 is controlled by the indoor controller 50a. The rotation speed of the indoor fan 7 is switchable to a plurality of stages. In this example, the rotation speed of the indoor fan 7 can be switched, for example, to three stages, that is, strong wind, intermediate wind, and weak wind. When the wind speed is set to an automatic mode by the remote controller 55, the rotation speed of the indoor fan 7 is switched in accordance with the temperature difference $\Delta T$ between the measured indoor temperature Ta and the set temperature Ts.

Rotation of the outdoor fan 6 is controlled by the outdoor controller 50b. The rotation speed of the outdoor fan 6 is switchable to a plurality of stages. In this example, the rotation speed of the outdoor fan 6 is switched in accordance with the temperature difference $\Delta T$ between the measured indoor temperature Ta and the set temperature Ts.

The indoor unit 5A includes a lateral wind direction plate 48 and a vertical wind direction plate 49. The lateral wind direction plate 48 and the vertical wind direction plate 49 change a blowing direction in which the conditioned air subjected to heat exchange in the indoor heat exchanger 45 is blown into the room by the indoor fan 7. The lateral wind direction plate 48 changes the blowing direction laterally, whereas the vertical wind direction plate 49 changes the blowing direction vertically. An angle of each of the lateral wind direction plate 48 and the vertical wind direction plate 49, that is, a direction of the blown airflow is controlled by the indoor controller 50a based on the setting by the remote controller 55.

A basic operation of the air conditioner 5 is as follows. During a cooling operation, the four-way valve 42 is switched to the position indicated by the solid line, and high-temperature and high-pressure gas refrigerant discharged from the compressor 8 flows into the outdoor heat exchanger 43. In this case, the outdoor heat exchanger 43 operates as a condenser. When air passes through the outdoor heat exchanger 43 by the rotation of the outdoor fan 6, the air absorbs heat of condensation from the refrigerant via heat exchange. The refrigerant is condensed into the high-pressure and low-temperature liquid refrigerant, and is adiabatically expanded in the expansion valve 44 to become low-pressure and low-temperature two-phase refrigerant.

The refrigerant passing through the expansion valve 44 flows into the indoor heat exchanger 45 of the indoor unit 5A. The indoor heat exchanger 45 operates as an evaporator. When air passes through the indoor heat exchanger 45 by the rotation of the indoor fan 7, heat of evaporation is taken from the air by the refrigerant via heat exchange. Thus, the cooled air is supplied to the room. The refrigerant evaporates to become low-temperature and low-pressure gas refrigerant, and is compressed by the compressor 8 to become high-temperature and high-pressure refrigerant again.

During a heating operation, the four-way valve 42 is switched to a position indicated by the dotted line, and the high-temperature and high-pressure gas refrigerant discharged from the compressor 8 flows into the indoor heat exchanger 45. In this case, the indoor heat exchanger 45 operates as a condenser. When air passes through the indoor heat exchanger 45 by the rotation of the indoor fan 7, the air absorbs heat of condensation from the refrigerant via heat exchange. Thus, the heated air is supplied to the room. The refrigerant is condensed into the high-pressure and low-temperature liquid refrigerant, and is adiabatically expanded in the expansion valve 44 to become low-pressure and low-temperature two-phase refrigerant.

The refrigerant passing through the expansion valve 44 flows into the outdoor heat exchanger 43 of the outdoor unit 5B. The outdoor heat exchanger 43 operates as an evaporator. When air passes through the outdoor heat exchanger 43 by the rotation of the outdoor fan 6, heat of evaporation is taken from the air by the refrigerant via heat exchange. The refrigerant evaporates to become low-temperature and low-pressure gas refrigerant, and is compressed by the compressor 8 to become high-temperature and high-pressure refrigerant.

Figure 2:
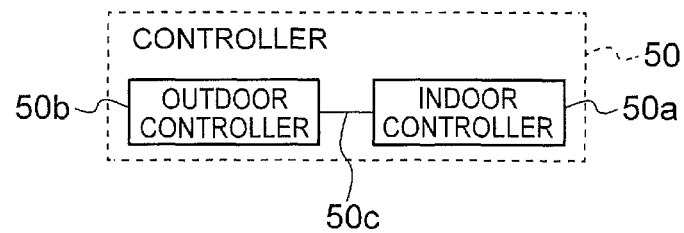
FIG. 2 is a conceptual diagram showing a basic configuration of a controller in the air conditioner of the first embodiment.

FIG. 2 is a conceptual diagram showing a basic configuration of a control system of the air conditioner 5. The above described indoor controller 50a and outdoor controller 50b exchange information therebetween via the communication cable 50c to control the air conditioner 5. In this example, a combination of the indoor controller 50a and the outdoor controller 50b will be referred to as the controller 50.

Figure 3A:
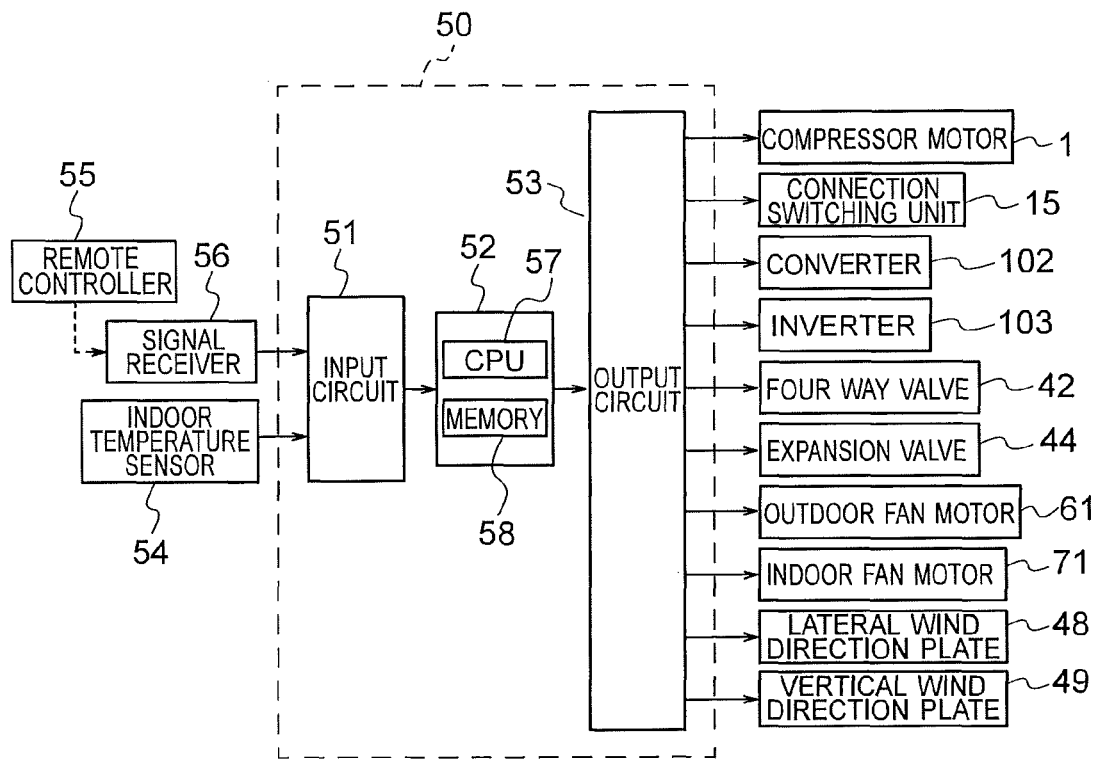
FIG. 3(A) is a block diagram showing a control system of the air conditioner of the first embodiment.

FIG. 3(A) is a block diagram showing the control system of the air conditioner 5. The controller 50 is constituted by, for example, a microcomputer. The controller 50 incorporates an input circuit 51, an arithmetic circuit 52, and an output circuit 53.

An instruction signal received by the signal receiver 56 from the remote controller 55 is input to the input circuit 51. The instruction signal includes, for example, signals for setting an operation input, an operation mode, a set temperature, an air volume, and a wind direction. Temperature information indicating the indoor temperature Ta detected by the indoor temperature sensor 54 is also input to the input circuit 51. The input circuit 51 outputs these input information to the arithmetic circuit 52.

The arithmetic circuit 52 includes a central processing unit (CPU) 57 and a memory 58. The CPU 57 performs arithmetic processing and determination processing. The memory 58 stores various setting values and programs used for controlling the air conditioner 5. The arithmetic circuit 52 performs arithmetic and determination based on the information input from the input circuit 51, and outputs the result to the output circuit 53.

The output circuit 53 outputs control signals to the compressor motor 1, a connection switching unit 15, a converter 102, an inverter 103, the four-way valve 42, the expansion valve 44, the outdoor fan motor 61, the indoor fan motor 71, the lateral wind direction plate 48, and the vertical wind direction plate 49, based on the information input from the arithmetic circuit 52.

As described above, the indoor controller 50a and the outdoor controller 50b (FIG. 2) exchange information with each other via the communication cable 50c to control various devices of the indoor unit 5A and the outdoor unit 5B. Thus, a combination of the indoor controller 50a and the outdoor controller 50b is referred to as the controller 50. In practice, each of the indoor controller 50a and the outdoor controller 50b is constituted by, for example, a microcomputer. In this regard, only one of the indoor unit 5A and the outdoor unit 5B may be provided with the controller to control various devices in the indoor unit 5A and the outdoor unit 5B.

Figure 3B:
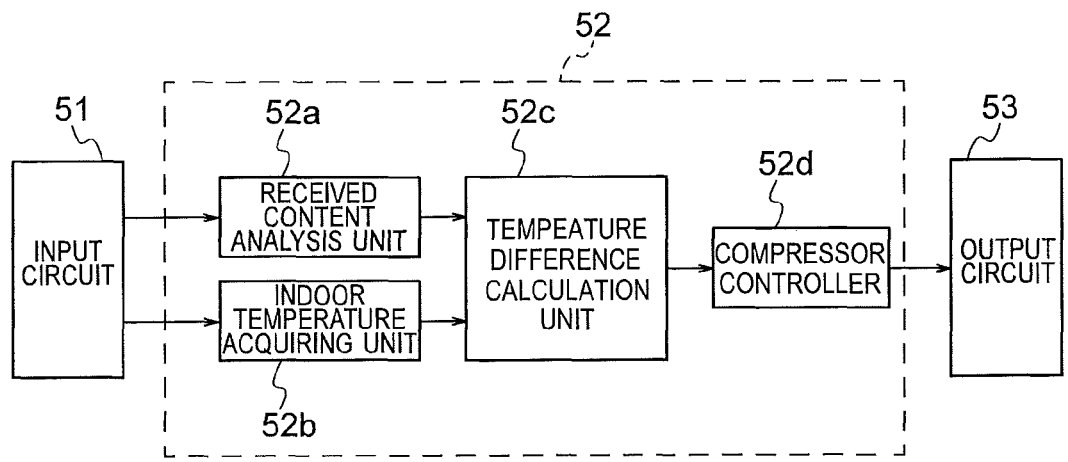
FIG. 3(B) is a block diagram showing a part of the control system that controls a compressor motor based on an indoor temperature.

FIG. 3(B) is a block diagram showing a part of the controller 50 that controls the compressor motor 1 based on the indoor temperature Ta. The arithmetic circuit 52 of the controller 50 includes a received content analysis unit 52a, an indoor temperature acquiring unit 52b, a temperature difference calculation unit 52c, and a compressor controller 52d. These units are included in, for example, the CPU 57 of the arithmetic circuit 52.

The received content analysis unit 52a analyzes an instruction signal input from the remote controller 55 via the signal receiver 56 and the input circuit 51. The received content analysis unit 52a outputs, for example, the operation mode and the set temperature Ts based on the analysis result to the temperature difference calculation unit 52c. The indoor temperature acquiring unit 52b acquires the indoor temperature Ta input from the indoor temperature sensor 54 via the input circuit and outputs the acquired indoor temperature Ta to the temperature difference calculation unit 52c.

The temperature difference calculation unit 52c calculates a temperature difference $\Delta T$ between the indoor temperature Ta input from the indoor temperature acquiring unit 52b and the set temperature Ts input from the received content analysis unit 52a. When the operation mode input from the received content analysis unit 52a is the heating operation, the temperature difference $\Delta T$ is calculated as $\Delta T=Ts-Ta$. When the operation mode is the cooling operation, the temperature difference $\Delta T$ is calculated as $\Delta T=Ta-Ts$. The temperature difference calculation unit 52c outputs the calculated temperature difference $\Delta T$ to the compressor controller 52d.

The compressor controller 52d controls a driving device 100 based on the temperature difference $\Delta T$ input from the temperature difference calculation unit 52c, thereby controlling the rotation speed of the compressor motor 1 (i.e., the rotation speed of the compressor 8).

(Configuration of Compressor)

Figure 4:
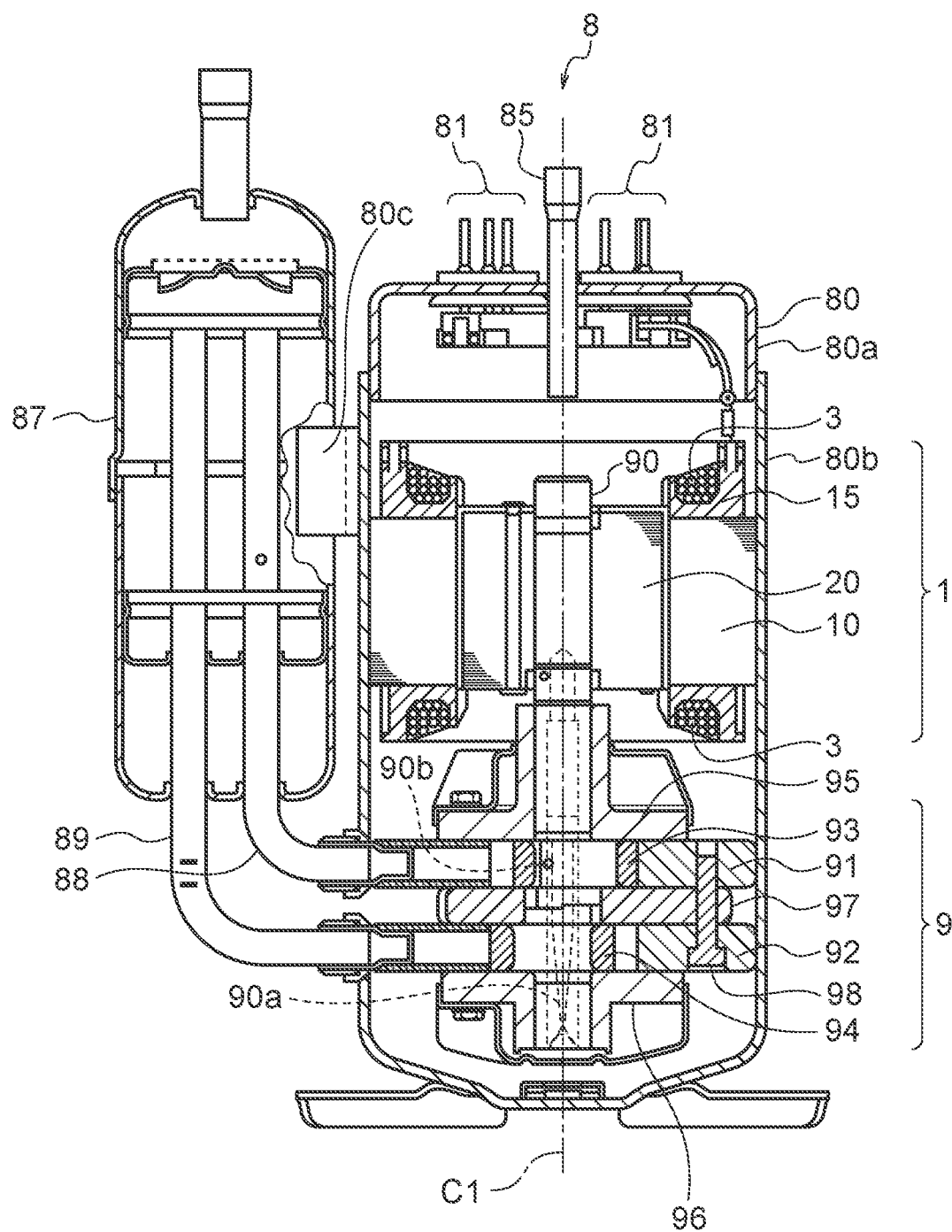
FIG. 4 is a sectional view showing a compressor of the first embodiment.

Next, a configuration of the compressor 8 will be described. FIG. 4 is a cross-sectional view showing a configuration of the compressor 8. The compressor 8 is constituted as, for example, a rotary compressor, and includes a shell 80, a compression mechanism 9 disposed in the shell 80, and the compressor motor 1 that drives the compression mechanism 9. The compressor 8 further includes a shaft 90 (crankshaft) that connects the compressor motor 1 and the compression mechanism 9 to each other so that a driving force can be transmitted between the compressor motor 1 and the compression mechanism 9. The shaft 90 is fitted into a shaft hole 27 (FIG. 5) of the rotor 20 of the compressor motor 1.

The shell 80 is a closed container formed of, for example, a steel sheet, and covers the compressor motor 1 and the compression mechanism 9. The shell 80 has an upper shell 80a and a lower shell 80b. The upper shell 80a is provided with a glass terminal 81 as a terminal part for supplying electric power from the outside of the compressor 8 to the compressor motor 1, and a discharge pipe 85 for discharging the refrigerant compressed in the compressor 8 to the outside. In this example, six lead wires in total are drawn out of the glass terminal 81, and the six lead wires include two lead wires for each of U-phase, V-phase, and W-phase of the coils 3 of the compressor motor 1 (FIG. 5). The lower shell 80b houses the compressor motor 1 and the compression mechanism 9.

The compression mechanism 9 has an annular first cylinder 91 and an annular second cylinder 92 along the shaft 90. The first cylinder 91 and the second cylinder 92 are fixed to an inner peripheral part of the shell 80 (lower shell 80b). An annular first piston 93 is disposed on an inner peripheral side of the first cylinder 91, and an annular second piston 94 is disposed on an inner peripheral side of the second cylinder 92. The first piston 93 and the second piston 94 are rotary pistons that rotate together with the shaft 90.

A partition plate 97 is provided between the first cylinder 91 and the second cylinder 92. The partition plate 97 is a disk-shaped member having a through hole at its center. A cylinder chamber of each of the first cylinder 91 and the second cylinder 92 is provided with a vane (not shown) that separates the cylinder chamber into a suction side and a compression side. The first cylinder 91, the second cylinder 92, and the partition plate 97 are integrally fixed together by bolts 98.

An upper frame 95 is disposed on an upper side of the first cylinder 91 to cover an upper side of the cylinder chamber of the first cylinder 91. A lower frame 96 is disposed on a lower side of the second cylinder 92 to cover a lower side of the cylinder chamber of the second cylinder 92. The upper frame 95 and the lower frame 96 rotatably support the shaft 90.

Refrigerating machine oil (not shown) for lubricating sliding parts of the compression mechanism 9 is stored in a bottom part of the lower shell 80b of the shell 80. The refrigerating machine oil flows upward through a hole 90a formed in the axial direction in the shaft 90, and is supplied to the sliding parts from oil supply holes 90b formed at a plurality of positions of the shaft 90.

A stator 10 of the compressor motor 1 is fitted to an inner side of the shell 80 by shrink fitting. Electric power is supplied to the coils 3 of the stator 10 from the glass terminal 81 attached to the upper shell 80a. The shaft 90 is fixed to the shaft hole 27 (FIG. 5) of the rotor 20.

An accumulator 87 for storing refrigerant gas is attached to the shell 80. The accumulator 87 is held by, for example, a holding part 80c provided on an outer side of the lower shell 80b. A pair of suction pipes 88 and 89 are attached to the shell 80, and the refrigerant gas is supplied from the accumulator 87 to the cylinders 91 and 92 via the suction pipes 88 and 89.

For example, R410A, R407C, R22, or the like may be used as the refrigerant. A low GWP (global warming coefficient) refrigerant is desirably used from the viewpoint of preventing global warming. For example, the following refrigerant may be used as the low GWP refrigerant.

(1) First, a halogenated hydrocarbon having a carbon double bond in its composition, such as hydro-fluoro-olefin (HFO)-1234yf ($CF_3CF=CH_2$), can be used. The GWP of HFO-1234yf is 4.

(2) A hydrocarbon having a carbon double bond in its composition, such as R1270 (propylene), may also be used. The GWP of R1270 is 3, which is lower than that of HFO-1234yf, but flammability of R1270 is higher than that of HFO-1234yf.

(3) A mixture containing at least one of a halogenated hydrocarbon having a carbon double bond in its composition or a hydrocarbon having a carbon double bond in its composition, such as a mixture of HFO-1234yf and R32, may also be used. The above described HFO-1234yf is low-pressure refrigerant and tends to cause large pressure loss, and may cause degradation of performance of a refrigeration cycle (especially, an evaporator). For this reason, a mixture of HFO-1234yf and either R32 or R41 which is higher pressure refrigerant than HFO-1234yf is desirable in practice.

A basic operation of the compressor 8 is as follows. Refrigerant gas supplied from the accumulator 87 is supplied to the cylinder chambers of the first cylinder 91 and the second cylinder 92 through the suction pipes 88 and 89. When the compressor motor 1 is driven to rotate the rotor 20, the shaft 90 rotates together with the rotor 20. Then, the first piston 93 and the second piston 94 fitted to the shaft 90 rotate eccentrically in the cylinder chambers to compress the refrigerant in the cylinder chambers. The compressed refrigerant flows upward in the shell 80 through holes (not shown) provided in the rotor 20 of the compressor motor 1 and is then discharged to the outside through the discharge pipe 85.

(Configuration of Compressor Motor)

Next, a configuration of the compressor motor 1 will be described. FIG. 5 is a sectional view showing a configuration of the compressor motor 1 of the first embodiment. The compressor motor 1 is a permanent magnet embedded motor. The compressor motor 1 includes a stator 10 and a rotor 20 rotatably provided inside the stator 10. An air gap of, for example, 0.3 to 1 mm, is formed between the stator 10 and the rotor 20. FIG. 5 is a cross-sectional view taken along a plane perpendicular to a rotation axis of the rotor 20.

Hereinafter, an axial direction (a direction of the rotation axis) of the rotor 20 will be simply referred to as an "axial direction". A direction along an outer periphery (circumference) of each of the stator 10 and the rotor 20 will be simply referred to as a "circumferential direction". A radial direction of each of the stator 10 and the rotor 20 is simply referred to as a "radial direction".

The stator 10 includes a stator core 11 and coils 3 wound around the stator core 11. The stator core 11 is obtained by stacking a plurality of electromagnetic steel sheets each having a thickness of 0.1 to 0.7 mm (here, 0.35 mm) in the direction of the rotation axis and fixing the steel sheets by crimping.

The stator core 11 includes an annular yoke part 13 and a plurality of tooth parts 12 (in this example, nine tooth parts) protruding inward in the radial direction from the yoke part 13. A slot is formed between each adjacent two tooth parts 12. Each of the tooth parts 12 has a tooth end part at an end on an inner side in the radial direction, and the tooth end part has a wider width (a dimension in the circumferential direction of the stator core 11).

The coil 3 as a stator winding is wound around each of the tooth parts 12 via an insulating body (insulator) 14. The coil 3 is obtained by, for example, winding a magnet wire having a wire diameter (diameter) of 0.8 mm around each of the tooth parts 12 by concentration winding in 110 turns. The number of turns and the wire diameter of each coil 3 are determined in accordance with properties (rotation speed, torque, or the like) required for the compressor motor 1, a supply voltage, or a cross-sectional area of the slot.

The coils 3 are constituted by three-phase windings of a U-phase, a V-phase and a W-phase (referred to as coils 3U, 3V and 3W). Both terminals of the coil 3 of each phase are opened. That is, the coils 3 have six terminals in total. A connection state of the coils 3 is switchable between a Y connection and a delta connection, which will be described later. The insulator 14 is made of, for example, a film formed of polyethylene terephthalate (PET) and has a thickness of 0.1 to 0.2 mm.

The stator core 11 has a configuration in which a plurality of (nine in this example) blocks are connected together via thin-wall parts. The magnet wire is wound around each of the tooth parts 12 in a state where the stator core 11 is unfolded in a belt shape, and then the stator core 11 is bent in a ring shape and both ends of the stator core are welded to each other. The stator core 11 is not limited to the above described configuration in which the plurality of blocks (divided cores) are connected together.

The rotor 20 includes a rotor core 21 and permanent magnets 25 attached to the rotor core 21. The rotor core 21 is obtained by stacking a plurality of electromagnetic steel sheets each having a thickness of 0.1 to 0.7 mm (0.35 mm in this example) in the direction of the rotation axis and fixing the steel sheets by crimping.

The rotor core 21 has a cylindrical shape and has the shaft hole 27 (center hole) formed at a center in the radial direction. The shaft as the rotation axis of the rotor 20 (i.e., the shaft 90 of the compressor 8 shown in FIG. 4) is fixed to the shaft hole 27 by shrink fitting, press fitting, or the like.

A plurality of (six in this example) magnet insertion holes 22 in which the permanent magnets 25 are inserted are formed along an outer peripheral surface of the rotor core 21. The magnet insertion holes 22 are openings. One magnet insertion hole 22 corresponds to one magnetic pole. In this example, the rotor 20 is provided with six magnet insertion holes 22, and thus the rotor 20 has six poles in total. The magnet insertion hole 22 in this example has a V-shape such that a center part in the circumferential direction protrudes inward in the radial direction. In this regard, the shape of the magnet insertion hole 22 is not limited to the V-shape and may be, for example, a straight shape.

Two permanent magnets 25 are disposed in each magnet insertion hole 22. That is, two permanent magnets 25 are disposed for one magnetic pole. In this example, the rotor 20 has six poles as described above, and thus twelve permanent magnets 25 are disposed in total.

The permanent magnet 25 is a flat-plate member elongated in the axial direction of the rotor core 21, has a width in the circumferential direction of the rotor core 21 and has a thickness in the radial direction of the rotor core 21. The permanent magnet 25 is constituted by, for example, a rare-earth magnet that contains neodymium (Nd), iron (Fe), and boron (B). The permanent magnet 25 is magnetized in the thickness direction. Two permanent magnets 25 disposed in one magnet insertion hole 22 are magnetized such that the same magnetic poles are oriented toward the same side in the radial direction.

Flux barriers 26 are formed on both sides of each magnet insertion hole 22 in the circumferential direction. The flux barriers 26 are openings that are formed continuously with the magnet insertion hole 22. The flux barriers 26 are provided for suppressing leakage magnetic flux between adjacent magnetic poles (i.e., magnetic flux flowing through inter-pole parts).

In the rotor core 21, a first magnet retention part 23 is formed as a protrusion at a center part of each magnet insertion hole 22 in the circumferential direction. Furthermore, in the rotor core 21, second magnet retention parts 24 are formed as protrusions on both ends of each magnet insertion hole 22 in the circumferential direction. The first magnet retention part 23 and the second magnet retention parts 24 are provided for positioning and retaining the permanent magnets 25 in each magnet insertion hole 22.

As described above, the number of slots of the stator 10 (i.e., the number of tooth parts 12) is nine, and the number of poles of the rotor 20 is six. That is, in the compressor motor 1, a ratio of the number of poles of the rotor 20 to the number of slots of the stator 10 is 2:3.

In the compressor motor 1, the connection state of the coils 3 is switched between the Y connection and the delta connection. When the delta connection is used, circulating current may flow and may cause degradation of performance of the compressor motor 1. The circulating current is caused by a third order harmonic wave generated in an induced voltage in the winding of each phase. It is known that, in the case of a concentrated winding where the ratio of the number of poles to the number of slots is 2:3, no third order harmonic wave is generated in the induced voltage and thus degradation of performance of the compressor motor 1 due to the circulating current does not occur if there is no influence of magnetic saturation or the like.

(Configuration of Driving Device)

Figure 6:
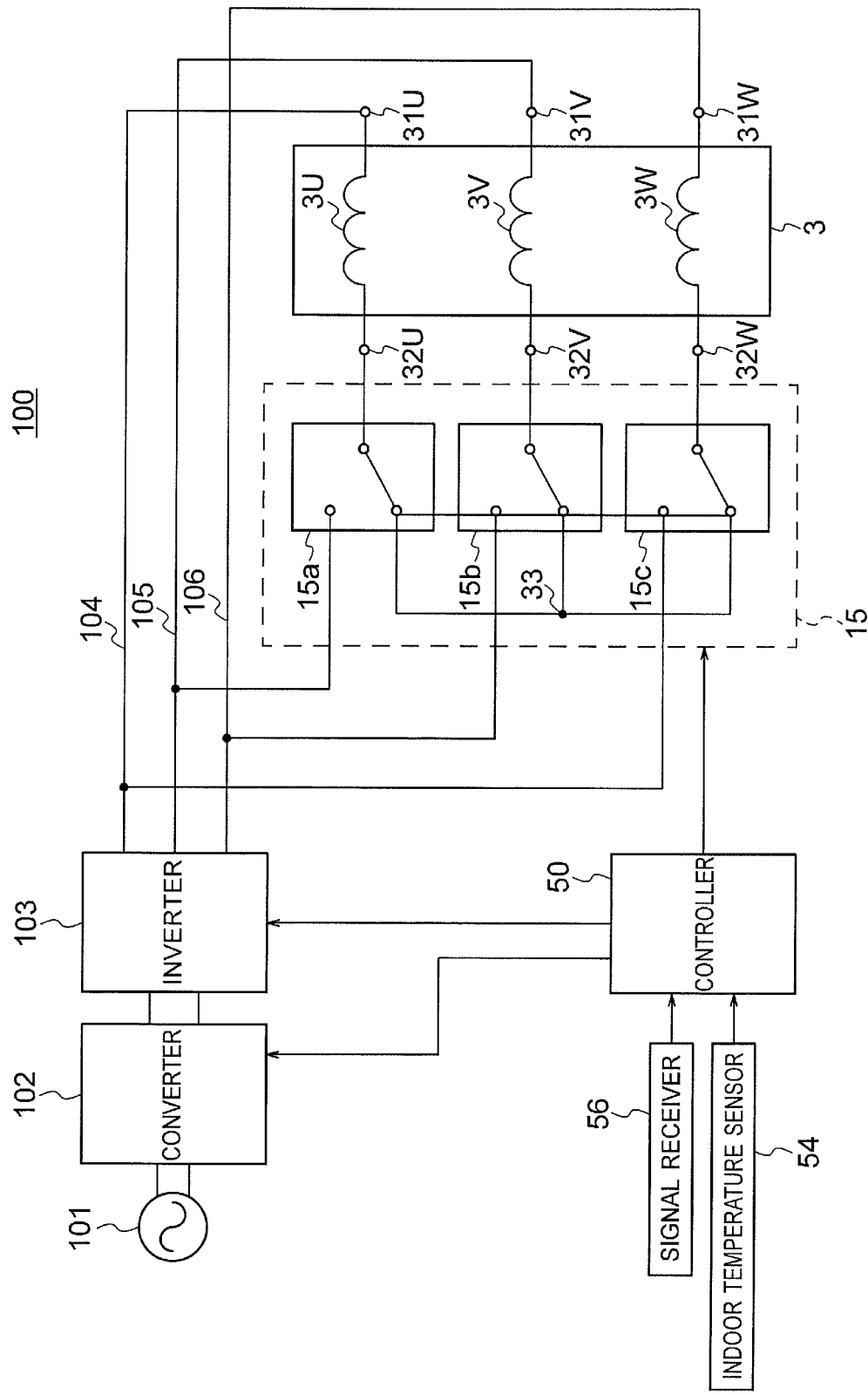
FIG. 6 is a block diagram showing a driving device that drives the compressor motor of the first embodiment.

Next, the driving device 100 that drives the compressor motor 1 will be described. FIG. 6 is a block diagram showing a configuration of the driving device 100. The driving device 100 includes the converter 102 that rectifies an output from a power source 101, the inverter 103 that outputs an AC voltage to the coils 3 of the compressor motor 1, the connection switching unit 15 that switches the connection state of the coils 3, and the controller 50. The converter 102 is supplied with electric power from the power source 101 which is an AC power source.

The power source 101 is the AC power source of, for example, 200 V (effective voltage). The converter 102 is a rectifier circuit and outputs a DC voltage of, for example, 280 V. The voltage output from the converter 102 is referred to as a bus voltage. The inverter 103 is supplied with a bus voltage from the converter 102 and outputs a line voltage (also referred to as a motor voltage) to the coils 3 of the compressor motor 1. The inverter 103 is connected to wires 104, 105, and 106 which are connected to coils 3U, 3V, and 3W, respectively.

The coil 3U has terminals 31U and 32U. The coil 3V has terminals 31V and 32V. The coil 3W has terminals 31W and 32W. The wire 104 is connected to the terminal 31U of the coil 3U. The wire 105 is connected to the terminal 31V of the coil 3V. The wire 106 is connected to the terminal 31W of the coil 3W.

The connection switching unit 15 has switches 15a, 15b, and 15c. The switch 15a connects the terminal 32U of the coil 3U to either the wire 105 or a neutral point 33. The switch 15b connects the terminal 32V of the coil 3V to either the wire 106 or the neutral point 33. The switch 15c connects the terminal 32W of the coil 3W to either the wire 104 or the neutral point 33. In this example, the switches 15a, 15b, and 15c of the connection switching unit 15 are constituted by mechanical switches (i.e., relay contacts).

The controller 50 controls the converter 102, the inverter 103, and the connection switching unit 15. The configuration of the controller 50 is as described with reference to FIG. 3. An operation instruction signal from the remote controller 55 received by the signal receiver 56 and an indoor temperature detected by the indoor temperature sensor 54 are input to the controller 50. Based on the input information, the controller 50 outputs a voltage switching signal to the converter 102, outputs an inverter driving signal to the inverter 103, and outputs a connection switching signal to the connection switching unit 15.

In a state shown in FIG. 6, the switch 15a connects the terminal 32U of the coil 3U to the neutral point 33, the switch 15b connects the terminal 32V of the coil 3V to the neutral point 33, and the switch 15c connects the terminal 32W of the coil 3W to the neutral point 33. That is, the terminals 31U, 31V, and 31W of the coils 3U, 3V, and 3W are connected to the inverter 103, and the terminals 32U, 32V, and 32W are connected to the neutral point 33.

Figure 7:
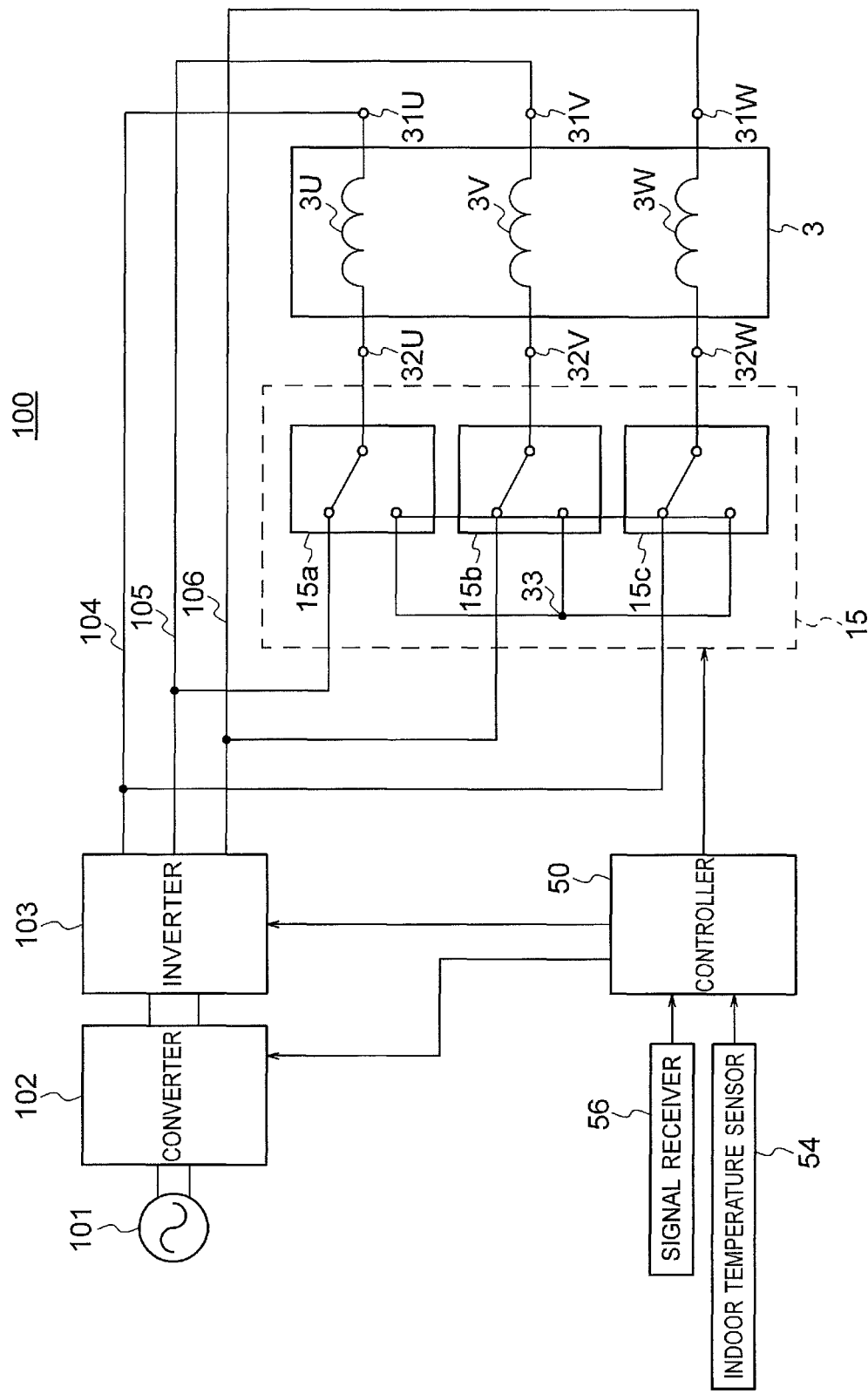
FIG. 7 is a block diagram showing the driving device that drives the compressor motor of the first embodiment.

FIG. 7 is a block diagram showing a state in which the switches 15a, 15b, and 15c of the connection switching unit 15 of the driving device 100 are switched. In a state shown in FIG. 7, the switch 15a connects the terminal 32U of the coil 3U to the wire 105, the switch 15b connects the terminal 32V of the coil 3V to the wire 106, and the switch 15c connects the terminal 32W of the coil 3W to the wire 104.

Figure 8B:
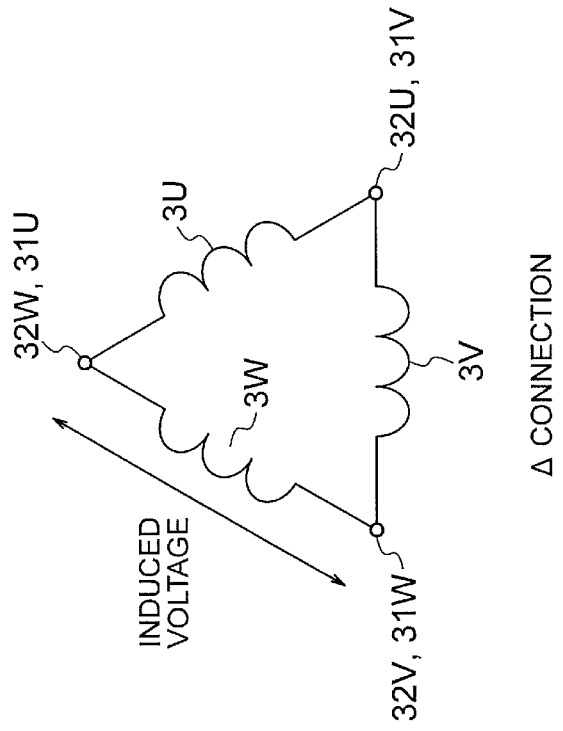
FIGS. 8(A) and 8(B) are schematic diagrams showing a switching operation of a connection state of the coils in the first embodiment.
Figure 8A:
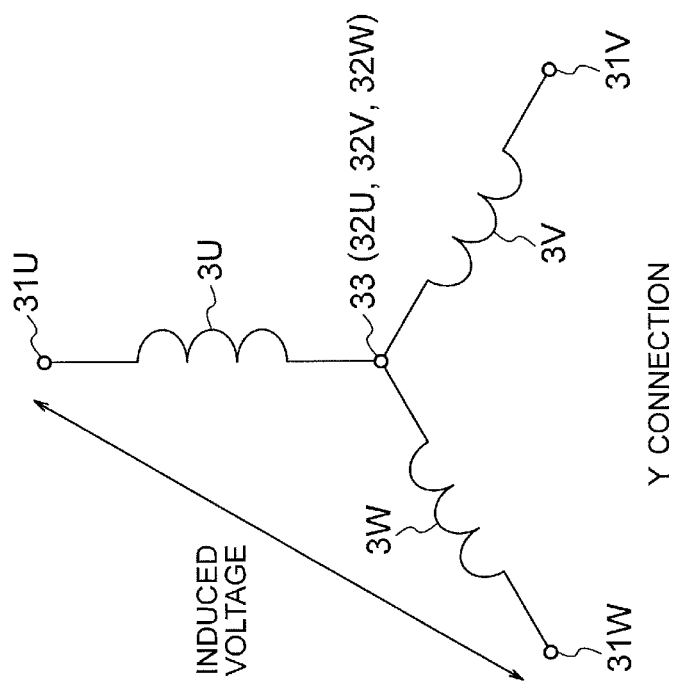

FIG. 8(A) is a schematic diagram showing the connection state of the coils 3U, 3V, and 3W when the switches 15a, 15b, and 15c are in the state shown in FIG. 6. The coils 3U, 3V and 3W are connected to the neutral point 33 at the terminals 32U, 32V and 32W, respectively. Thus, the connection state of the coils 3U, 3V, and 3W is the Y connection (star connection).

FIG. 8(B) is a schematic diagram showing the connection state of the coils 3U, 3V, and 3W when the switches 15a, 15b, and 15c are in the state shown in FIG. 7. The terminal 32U of the coil 3U is connected to the terminal 31V of the coil 3V via the wire 105 (FIG. 7). The terminal 32V of the coil 3V is connected to the terminal 31W of the coil 3W via the wire 106 (FIG. 7). The terminal 32W of the coil 3W is connected to the terminal 31U of the coil 3U via the wire 104 (FIG. 7). Thus, the connection state of the coils 3U, 3V, and 3W is the delta connection.

In this way, the connection switching unit 15 is capable of switching the connection state of the coils 3U, 3V, and 3W of the compressor motor 1 between the Y connection (first connection state) and the delta connection (second connection state) by switching the switches 15a, 15b, and 15c.

Figure 9:
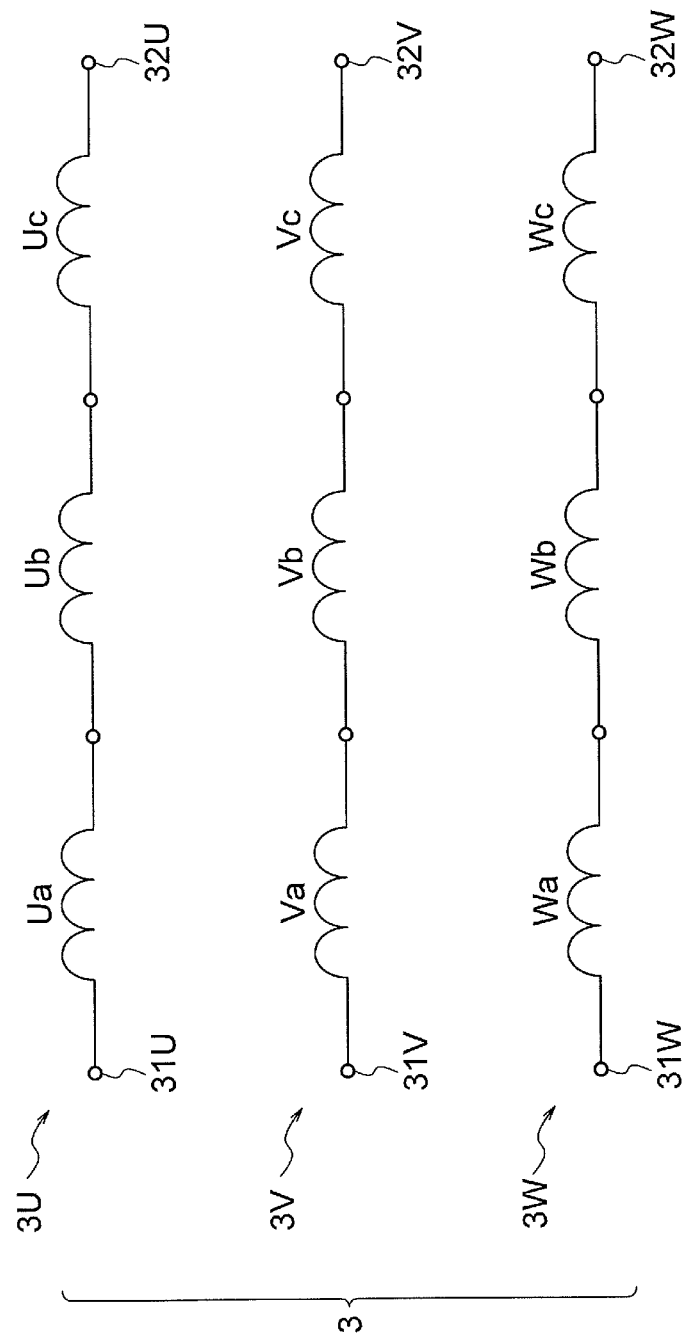
FIG. 9 is a schematic diagram showing the connection state of the coils in the first embodiment.

FIG. 9 is a schematic diagram showing coil parts of the coils 3U, 3V, and 3W. As described above, the compressor motor 1 has nine tooth parts 12 (FIG. 1), and each of the coils 3U, 3V, and 3W is wound around three tooth parts 12. That is, the coil 3U is obtained by connecting, in series, U-phase coil parts Ua, Ub, and Uc which are wound around three tooth parts 12. Similarly, the coil 3V is obtained by connecting, in series, V-phase coil parts Va, Vb, and Vc which are wound around three tooth parts 12. The coil 3W is obtained by connecting, in series, W-phase coil parts Wa, Wb, and Wc which are wound around three tooth parts 12.

(Method for Controlling Operation of Air Conditioner)

Figure 10:
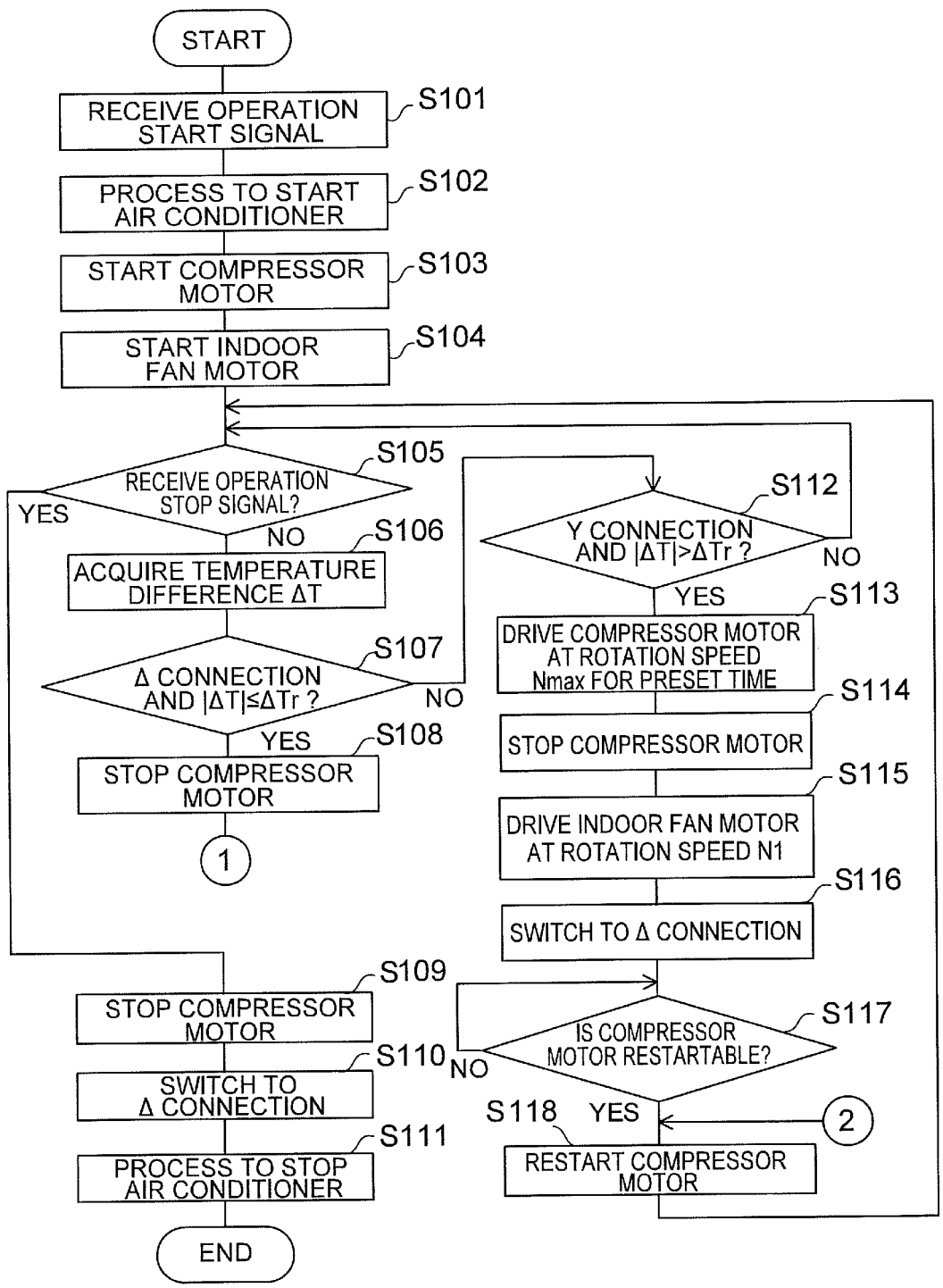
FIG. 10 is a flowchart for explaining a method for controlling an operation of the air conditioner of the first embodiment.
Figure 11:
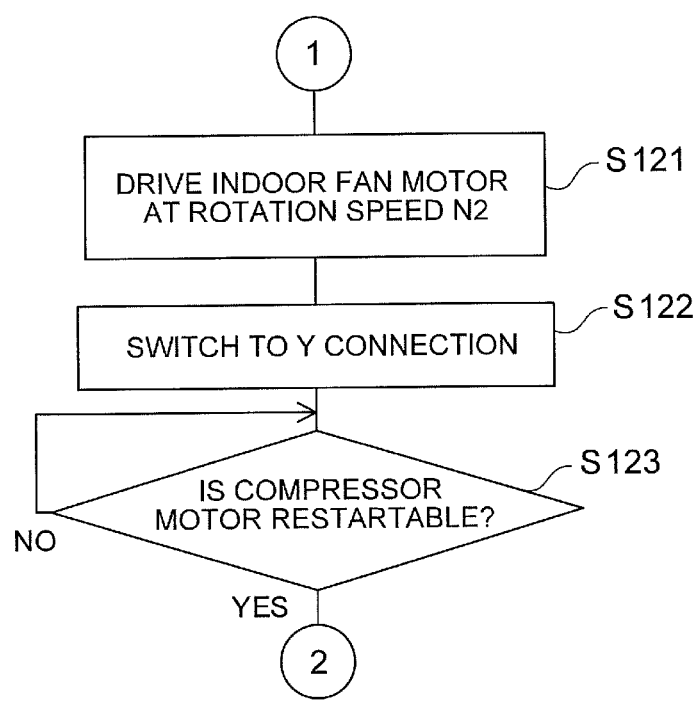
FIG. 11 is a flowchart for explaining the operation control method of the air conditioner of the first embodiment.

FIGS. 10 and 11 are flowcharts showing a method for controlling an operation of the air conditioner 5. The controller 50 of the air conditioner 5 starts the operation of the air conditioner 5 when the signal receiver 56 receives a start signal from the remote controller 55 (step S101). In this example, the CPU 57 of the controller 50 is activated.

Then, the controller 50 performs start processing of the air conditioner 5 (step S102). Specifically, for example, the rotation of the outdoor fan motor 61 is started.

Then, the controller 50 starts the rotation of the compressor motor 1 (step S103). As will be described later, the air conditioner 5 finishes the previous operation after switching the connection state of the coils 3 to the delta connection, and thus the compressor motor 1 is started in the delta connection. The controller 50 controls the output voltage from the inverter 103 to control the rotation speed of the compressor motor 1.

Detailed description on controlling the rotation speed of the compressor motor 1 is omitted. For example, the rotation speed of the compressor motor 1 is increased in stages at a predetermined speed in accordance with the temperature difference ΔT between the indoor temperature Ta detected by the indoor temperature sensor 54 and the set temperature Ts. A maximum allowable rotation speed of the compressor motor 1 is, for example, 130 rps. Thus, an amount of the refrigerant circulated by the compressor 8 is increased, so that a cooling capacity is increased during a cooling operation, and a heating capacity is increased during a heating operation.

When the indoor temperature Ta approaches the set temperature Ts due to air conditioning effect and the temperature difference ΔT shows a tendency to decrease, the controller 50 decreases the rotation speed of the compressor motor 1 in accordance with the temperature difference ΔT. When the temperature difference ΔT decreases to a preset temperature near zero (but greater than 0), the controller 50 operates the compressor motor 1 at an allowable minimum rotation speed (for example, 20 rps).

When the indoor temperature Ta reaches the set temperature Ts (i.e., when the temperature difference ΔT is 0 or less), the controller 50 stops the rotation of the compressor motor 1 in order to prevent overcooling (or overheating). Then, when the temperature difference ΔT becomes larger than 0 again, the controller 50 restarts the rotation of the compressor motor 1. The controller 50 restricts the rotation restart of the compressor motor 1 in a short time period so as not to repeat rotation and stop of the compressor motor 1 in the short time period. Furthermore, when the rotation speed of the compressor motor 1 reaches a preset rotation speed, the inverter 103 starts the field-weakening control.

After the compressor motor 1 is started, the controller 50 starts the rotation of the indoor fan motor 71 (step S104). The indoor fan motor 71 rotates at a rotation speed in accordance with the setting set by the remote controller 55, for example. In the air conditioner 5 having an air conditioning capacity of 4 kW within a rated air conditioning capacity range, the rotation speed of the indoor fan motor 71 is in a range of 0 to 1700 rpm.

The controller 50 determines whether or not an operation stop signal (a signal to stop an operation of the air conditioner 5) is received from the remote controller 55 via the signal receiver 56 (step S105). When the operation stop signal is not received, the controller 50 proceeds to step S106. In contrast, when the operation stop signal is received, the controller 50 proceeds to step S109.

In step S106, the controller 50 acquires the temperature difference ΔT between the indoor temperature Ta detected by the indoor temperature sensor 54 and the set temperature Ts. Based on the temperature difference ΔT, the controller 50 determines whether or not the switching from the delta connection to the Y connection of the coils 3 is necessary. That is, the controller 50 determines whether or not the connection state of the coils 3 is the delta connection and an absolute value of the above described temperature difference ΔT is equal to or less than a threshold ΔTr (step S107). The threshold ΔTr is a temperature difference corresponding to an air-conditioning load (also simply referred to as a "load") that is small enough to perform switching to the Y connection.

As described above, ΔT is represented as ΔT=Ts−Ta when the operation mode is the heating operation, and is represented as ΔT=Ta−Ts when the operation mode is the cooling operation. In this example, the absolute value of ΔT and the threshold ΔTr are compared with each other to determine whether or not the switching to the Y connection is necessary.

When the result of the determination in step S107 indicates that the connection state of the coils 3 is the delta connection and that the absolute value of the temperature difference ΔT is equal to or less than the threshold ΔTr, the controller 50 outputs a stop signal to the inverter 103 and stops the rotation of the compressor motor 1 (step S108). After the rotation of the compressor motor 1 is stopped, the controller 50 proceeds to step S121 in FIG. 11.

In step S121 in FIG. 11, the controller 50 changes the rotation speed of the indoor fan motor 71 to a preset rotation speed N2 and continues the rotation of the indoor fan motor 71. Then, the controller 50 outputs a connection switching signal to the connection switching unit 15 to switch the connection state of the coils 3 from the delta connection to the Y connection (step S122).

After the connection state of the coils 3 is switched to the Y connection, the controller 50 determines whether the compressor motor 1 is restartable (i.e., restart of rotation is possible) or not (step S123). Specifically, for example, a timer is started at the same time as when the compressor motor 1 is stopped in step S108, and it is determined whether or not a waiting time t1 elapses. The waiting time t1 is a time required until a refrigeration pressure in the refrigeration cycle is substantially uniformized, and is, for example, 60 to 300 seconds.

Whether the compressor motor 1 is restartable or not can also be determined by other methods. For example, it is possible to measure a differential pressure of the compressor 8, and to determine that the compressor motor 1 is restartable when the differential pressure falls below a threshold.

When the controller 50 determines that the compressor motor 1 is restartable (YES in step S123), the controller 50 proceeds to step S118 in FIG. 10, and restarts the compressor motor 1. Thus, the rotation of the compressor motor 1 is restarted in a state where the connection state of the coils 3 is switched to the Y connection.

In contrast, when the result of the comparison in the above described step S107 indicates that the connection state of the coils 3 is not the delta connection (when it is the Y connection), or that the absolute value of the temperature difference ΔT is larger than the threshold ΔTr (in other words, when it is not necessary to switch to the Y connection), the controller 50 proceeds to step S112.

In step S112, it is determined whether or not the switching from the Y connection to the delta connection is necessary. That is, it is determined whether or not the connection state of the coils 3 is the Y connection and the absolute value of the temperature difference ΔT is larger than the threshold ΔTr.

When the result of the determination in step S112 indicates that the connection state of the coils 3 is the Y connection and that the absolute value of the temperature difference ΔT is larger than the threshold ΔTr (YES in step S112), the controller 50 increases the rotation speed of the compressor motor 1 up to a preset rotation speed Nmax and continues the rotation of the compressor motor 1 for a preset time period (step S113). This is in order to increase a circulation amount of the refrigerant before the rotation of the compressor motor 1 is stopped. The rotation speed Nmax at this time is desirably the maximum value of the rotation speed of the compressor motor 1 within a rotation speed range during the normal operation of the compressor motor 1. However, the rotation speed at this time is not limited to the maximum value, and it is sufficient to increase the rotation speed of the compressor motor 1.

Thereafter, the controller 50 outputs a stop signal to the inverter 103 to stop the rotation of the compressor motor 1 (step S114). After the rotation of the compressor motor 1 is stopped, the controller 50 changes the rotation speed of the indoor fan motor 71 to a preset rotation speed N1 and continues the rotation of the indoor fan motor 71 (step S115). Subsequently, the controller 50 outputs a connection switching signal to the connection switching unit 15 to switch the connection state of the coils 3 from the Y connection to the delta connection (step S116).

After the connection state of the coils 3 is switched to the delta connection, the controller 50 determines whether the compressor motor 1 is restartable or not (step S117). The determination of whether the compressor motor 1 is restartable or not is as described above with regard to step S123. When the controller 50 determines that the compressor motor 1 is restartable (YES in step S117), the controller 50 restarts the compressor motor 1 (step S118). Thus, the rotation of the compressor motor 1 is restarted in a state where the connection state of the coils 3 is switched to the delta connection.

In the case of the delta connection, the compressor motor 1 can be driven up to a higher rotational speed than in the case of the Y connection, and thus it is possible to respond to a larger load. Therefore, the temperature difference ΔT between the indoor temperature and the set temperature can be converged in a short time. Thereafter, the controller 50 returns to the above described step S105.

When the result of the comparison in the above described step S112 indicates that the connection state of the coils 3 is not the Y connection (when it is the delta connection), or that the absolute value of the temperature difference ΔT is equal to or less than the threshold ΔTr (in other words, when it is not necessary to switch to the delta connection), the controller 50 returns to step S105.

Meanwhile, when the operation stop signal is received in step S105 described above, the rotation of the compressor motor 1 is stopped (step S109). Thereafter, the controller 50 switches the connection state of the coils 3 from the Y connection to the delta connection (step S110). When the connection state of the coils 3 is already the delta connection, this connection state is maintained. Although omitted in FIG. 10, even when the controller 50 receives the operation stop signal during a period from step S106 to step S117, the controller 50 proceeds to step S109 to stop the rotation of the compressor motor 1.

Then, the controller 50 performs processing to stop the air conditioner 5 (step S111). Specifically, the controller 50 stops the indoor fan motor 71 and the outdoor fan motor 61. Thereafter, the CPU 57 of the controller 50 is stopped, and the operation of the air conditioner 5 is terminated.

As described above, when the absolute value of the temperature difference ΔT between the indoor temperature Ta and the set temperature Ts is relatively small (that is, when the absolute value is equal to or less than the threshold ΔTr), the compressor motor 1 is operated in the Y connection that enables high efficiency operation. When it is necessary to respond to a larger load, that is, when the absolute value of the temperature difference ΔT is larger than the threshold ΔTr, the compressor motor 1 is operated in the delta connection that enables responding to the larger load. Thus, operation efficiency of the air conditioner 5 can be enhanced.

(Functions of Air Conditioner)

In the operation of the above described air conditioner 5, the rotation of the compressor motor 1 is stopped before the connection state of the coils 3 is switched (steps S108 and S114 in FIG. 10), in order to enhance stability of the controlling the compressor motor 1.

Moreover, in order to reduce the load on the compressor motor 1 when the compressor motor 1 is restarted, a stop period of, for example, 60 to 300 seconds (i.e., a time period during which the rotation of the compressor motor 1 is stopped) is provided before the restart of the compressor motor 1. This stop period correspond to a time period required until the pressure difference (differential pressure) between a discharge side and a suction side of the compressor 8 sufficiently decreases, and also corresponds to a time period required until the refrigerant pressure in the refrigeration cycle is substantially uniformized.

Meanwhile, when the operation of the air conditioner 5 is stopped, user comfort is reduced. Specifically, the switching from the Y connection to the delta connection is performed in a state where the temperature difference ΔT between the indoor temperature Ta and the set temperature Ts is large, such as a case where outside air flows into the room by opening and closing of a window. If the operation of the air conditioner 5 is stopped in such a state, user comfort is largely reduced.

For this reason, in the first embodiment, the rotation of the indoor fan motor 71 is continued in the stop period of the compressor motor 1. Even when the rotation of the compressor motor 1 stops, the refrigerant continuously flows due to the differential pressure in the compressor 8, and thereby the temperature difference between the refrigerant and the indoor air still remains.

Thus, by rotating the indoor fan motor 71 to cause the indoor fan 7 to blow air, the air subjected to heat exchange with the refrigerant in the indoor heat exchanger 45 can be supplied to the room. That is, in the cooling operation, the air cooled by the heat exchange with the refrigerant in the indoor heat exchanger 45 can be supplied to the room. In the heating operation, the air heated by the heat exchange with the refrigerant in the indoor heat exchanger 45 can be supplied to the room. Thus, reduction in comfort in the room in the stop period of the compressor motor 1 can be suppressed.

The indoor fan motor 71 starts the rotation before beginning of the stop period of the compressor motor 1 (more specifically, step S104 in FIG. 10), and continues rotation even after the stop period of the compressor motor 1 begins. Consequently, the number of times of stop and restart of the indoor fan motor 71 can be reduced. The motor generally has low energy efficiency at the start, and thus the reduction in the number of times of stop and restart makes it possible to reduce power consumption. In addition, the number of times that the controller 50 outputs the stop signal or a restart signal can also be reduced, and thus control of the indoor fan motor 71 can be simplified.

The switching from the delta connection to the Y connection is performed in a state where the indoor temperature approaches the set temperature and the air conditioning load decreases. Thus, in the stop period of the compressor motor 1, it is desirable to set the rotation speed N2 of the indoor fan motor 71 to a relatively low speed to thereby reduce power consumption. When the indoor temperature is sufficiently close to the set temperature, the rotation of the indoor fan motor 71 may be stopped (as will be described later with reference to FIG. 13).

In contrast, the switching from the Y connection to the delta connection is performed in a state where the air conditioning load increases, such as when the indoor temperature approaches the set temperature and thereafter outside air flows into the room by opening and closing the window. Thus, it is necessary to increase the rotation speed N1 of the indoor fan motor 71 in the stop period to supplement the air conditioning capacity.

Therefore, the rotation speed N1 of the indoor fan motor 71 at the time of switching from the Y connection to the delta connection is performed is set higher than the rotation speed N2 of the indoor fan motor 71 at the time of switching from the delta connection to the Y connection (N1>N2). In the air conditioner 5 of 4 kW within the rated air conditioning capacity range, the rotation speed N1 is, for example, 1700 rpm, and the rotation speed N2 is, for example, 1100 rpm.

In the first embodiment, when the switching from the Y connection to the delta connection is performed, the rotation of the compressor motor 1 is stopped after the compressor motor 1 is rotated at the maximum rotation speed (Nmax) in a rotation speed range set for the Y connection (hereinafter referred to as a set range) (step S113 described above). As described above, the heating or cooling capacity (air conditioning capacity) can be obtained by rotating the indoor fan motor 71 in the stop period of the compressor motor 1, but the air conditioning capacity of the indoor fan motor 71 decreases as the temperature difference between the refrigerant and the indoor air decreases.

For this reason, before the rotation of the compressor motor 1 is stopped, the compressor motor 1 is rotated at the maximum rotation speed (Nmax) within the set range for a specified time period to thereby increase the circulation amount of the refrigerant to increase a temperature difference between the refrigerant and the indoor air in advance. Consequently, the air conditioning capacity of the indoor fan motor 71 in the stop period of the compressor motor 1 can be enhanced.

Although the compressor motor 1 rotates at the maximum rotation speed within the set range in this example, the rotation speed of the compressor motor 1 is not limited to the maximum rotation speed. It is sufficient that the rotation speed of the compressor motor 1 is higher than, for example, the rotation speed of the compressor motor 1 when the determination in step S112 is performed.

Although the rotation speeds of the indoor fan motor 71 are set to N1 and N2 in this example (steps S115 and S121), the rotation speed of the indoor fan motor 71 may be increased in accordance with a decrease in the difference between the temperature of the refrigerant and the temperature of the air. Furthermore, although the indoor fan motor 71 is constantly rotated during the stop period of the compressor motor 1 in this example, the indoor fan motor 71 may be rotated only for a time period within the stop period of the compressor motor 1 (for example, only when a certain condition is satisfied as will be described in the second embodiment and the like).

In the above described operation of the air conditioner 5, the determination of necessity of the switching from the delta connection to the Y connection (step S107) and the determination of necessity of the switching from the Y connection to the delta connection (step S112) are successively performed. However, the switching from the delta connection to the Y connection is performed in a case where the air conditioning load decreases (the indoor temperature approaches the set temperature), and there is a low possibility that a sudden increase in the air conditioning load occurs thereafter, and thus the frequent switching of the connection is less likely to occur.

At the end of the operation of the air conditioner 5, the connection state of the coils 3 is switched to the delta connection (step S110), and thus, at the start of the operation of the air conditioner 5, the compressor motor 1 is started in the delta connection (step S103). At the start of the operation of the air conditioner 5, the difference between the indoor temperature and the set temperature is generally large (in other words, the air conditioning load is large). For this reason, by starting the compressor motor 1 in a state where the connection state of the coils 3 is in the delta connection, the difference ΔT between the indoor temperature Ta and the set temperature Ts can be converged in a shorter time.

(Effects of First Embodiment)

As described above, in the air conditioner 5 of the first embodiment, the stop period during which the rotation of the compressor motor 1 is stopped is provided before the connection switching unit 15 switches the connection state of the coils 3, and the indoor fan motor 71 is rotated for at least a time period within the stop period. Thus, the air conditioning capacity can be supplemented by air blowing by the indoor fan 7, and the reduction in user comfort can be suppressed.

When the connection switching unit 15 switches the connection state of the coils 3 from the Y connection (first connection state) to the delta connection (second connection state), the compressor motor 1 is driven at the increased rotation speed before the stop period of the compressor motor 1 begins, and thus the circulation amount of the refrigerant can be temporarily increased to increase the temperature difference between the refrigerant and the indoor air. Consequently, the air conditioning capacity achieved by air blowing by the indoor fan 7 in the stop period can be enhanced.

The indoor fan motor 71 starts the rotation before the stop period of the compressor motor 1 begins, and the indoor fan motor 71 continues rotation in the stop period, and thus the number of times of stop and start of the indoor fan motor 71 can be reduced and the power consumption can be reduced.

The rotation speed N1 of the indoor fan motor 71 in the stop period of the compressor motor 1 when the connection state of the coils 3 is switched from the Y connection to the delta connection, and the rotation speed N2 of the indoor fan motor 71 in the stop period of the compressor motor 1 when the connection state of the coils 3 is switched from the delta connection to the Y connection satisfy N1>N2. Therefore, the indoor fan 7 can perform the air blowing operation depending on magnitude of the air conditioning load.

Since the connection state of the coils 3 is switched based on the indoor temperature detected by the indoor temperature sensor 54, the operation state of the compressor 8 can be quickly adapted to a sudden change in the air conditioning load, and thus comfort can be increased.

Since the connection state of the coils 3 is switched between the Y connection (first connection state) and the delta connection (second connection state) in which a line voltage is lower than in the Y connection, the connection state suitable for the rotation speed of the compressor motor 1 can be selected.

Modifications

Figure 12:
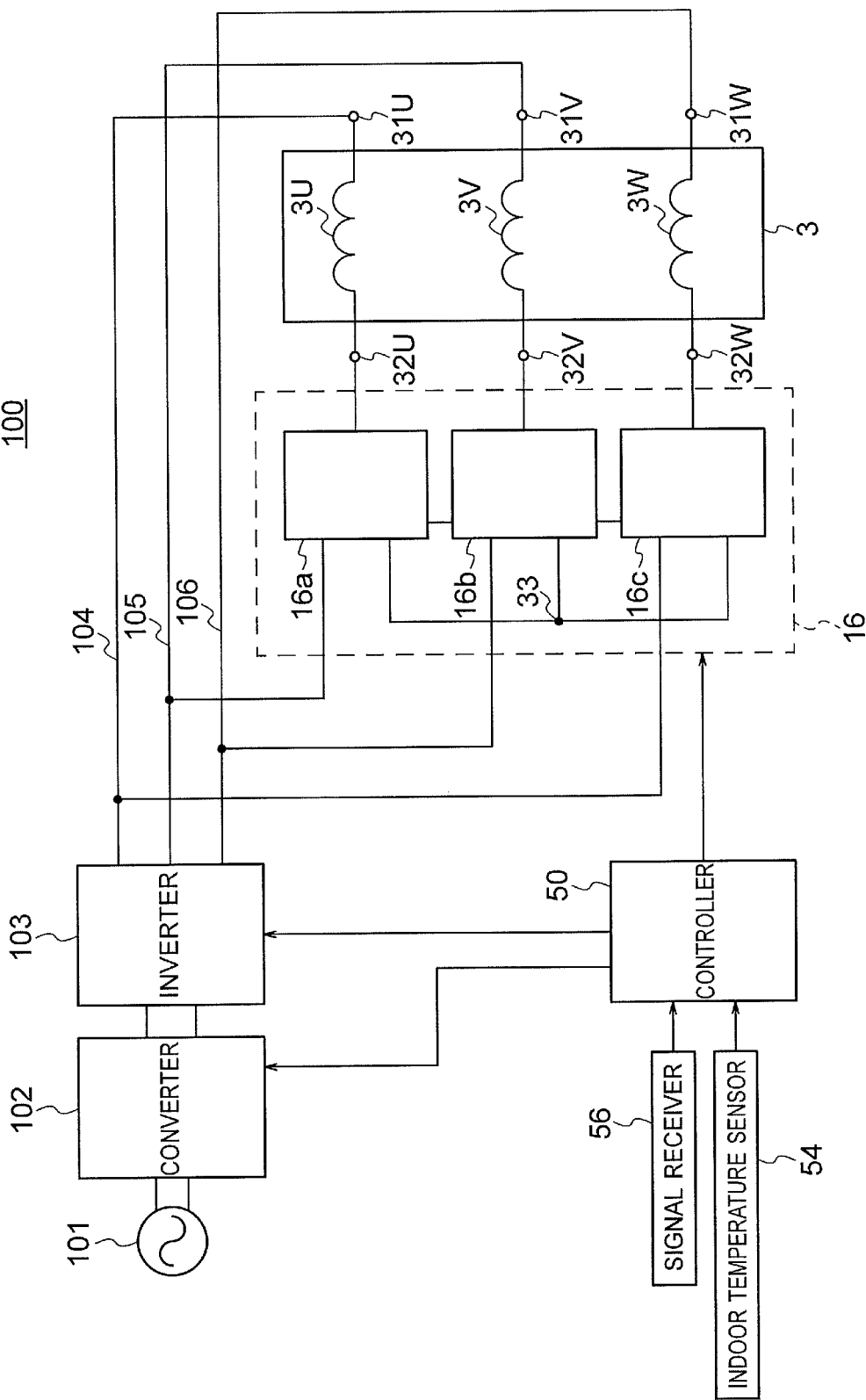
FIG. 12 is a block diagram showing another configuration example of the driving device in the first embodiment.

FIG. 12 is a block diagram showing another configuration example of the driving device 100 in the first embodiment. While the connection switching unit 15 (FIG. 6) of the driving device 100 described above includes the mechanical switches 15a, 15b, and 15c, a connection switching unit 16 in the configuration example shown in FIG. 12 includes semiconductor switches 16a, 16b, and 16c.

The semiconductor switches 16a, 16b, and 16c are constituted by, for example, MOS transistors or the like. The semiconductor switch 16a connects the terminal 32U of the coil 3U to either the wire 105 or the neutral point 33. The semiconductor switch 16b connects the terminal 32V of the coil 3V to either the wire 106 or the neutral point 33. The semiconductor switch 16c connects the terminal 32W of the coil 3W to either the wire 104 or the neutral point 33.

In this configuration example, the connection switching unit 16 includes the semiconductor switches 16a, 16b, and 16c, and thus the connection state of the coils 3 can be switched at high speed, and power consumption can be reduced. Other components are as described with reference to FIG. 6.

Second Embodiment

Figure 13:
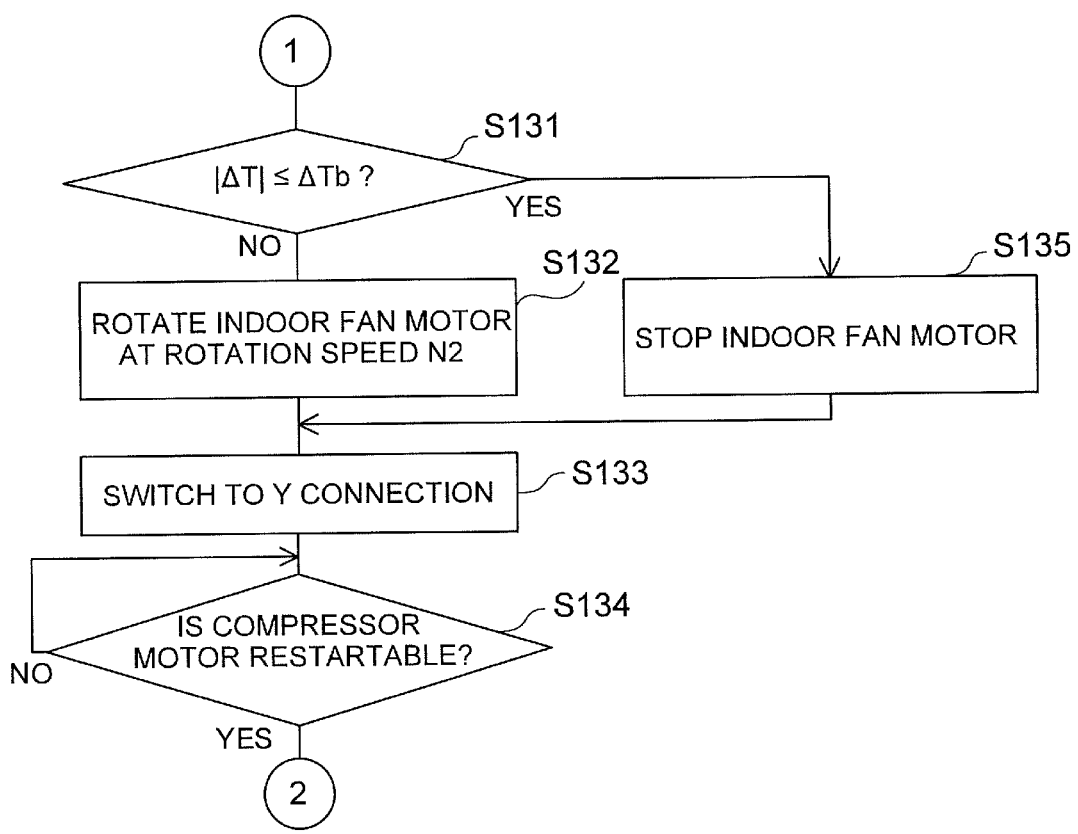
FIG. 13 is a flowchart for explaining a method for controlling an operation of an air conditioner of a second embodiment.

Next, a second embodiment of the present invention will be described. FIG. 13 is a flowchart showing an operation in the second embodiment. Processing shown in FIG. 13 is performed following step S108 in FIG. 10, as is the case with the processing shown in FIG. 11.

In the above described first embodiment, when the switching from the delta connection to the Y connection is performed, the controller 50 stops the rotation of the compressor motor 1 (step S108 in FIG. 10) and then rotates the indoor fan motor 71 at the rotation speed N2 (step S121 in FIG. 11).

In contrast, in the second embodiment, when the switching from the delta connection to the Y connection is performed, the controller 50 stops the rotation of the compressor motor 1, and then the controller 50 compares a threshold Tb and an absolute value of a temperature difference ΔT between the indoor temperature Ta detected by the indoor temperature sensor 54 and the set temperature Ts (i.e., the temperature difference ΔT acquired in step S106 of FIG. 10) (step S131). When the absolute value of the temperature difference ΔT is equal to or less than the threshold Tb, the controller 50 stops the rotation of the indoor fan motor 71 (step S135).

In contrast, when the absolute value of the temperature difference ΔT is larger than the threshold Tb, the indoor fan motor 71 is rotated at the rotation speed N2 as in the first embodiment (step S132). The threshold Tb is a value smaller than the above described threshold Tr, and is a temperature difference that is so small that it is not necessary to rotate the indoor fan motor 71 in the stop period of the compressor motor 1.

Thereafter, the controller 50 switches the connection state of the coils 3 from the delta connection to the Y connection (step S133), waits until the compressor motor 1 becomes restartable (step S134), and then restarts the compressor motor 1 (step S118 in FIG. 10). The order of steps S133 and S134 may be reversed. The switching from the Y connection to the delta connection is performed in the same manner as in the first embodiment.

The switching from the delta connection to the Y connection is performed in a state where the indoor temperature Ta approaches the set temperature Ts and the air conditioning load decreases. Thus, in a case where the indoor temperature Ta is sufficiently close to the set temperature Ts, the reduction in comfort in the room is small even when the indoor fan 7 does not blow air. In the second embodiment, when the absolute value of the temperature difference ΔT between the indoor temperature Ta and the set temperature Ts is equal to or less than the threshold Tb (i.e., when the indoor temperature Ta is sufficiently close to the set temperature Ts), the rotation of the indoor fan motor 71 is stopped in the stop period of the compressor motor 1, and thus power consumption can be reduced.

As described above, in the second embodiment, when the indoor temperature Ta detected by the indoor temperature sensor 54 is different from the set temperature Ts, the indoor fan motor 71 is rotated in the stop period of the compressor motor 1. More specifically, when the absolute value of the difference ΔT between the indoor temperature Ta detected by the indoor temperature sensor 54 and the set temperature Ts is larger than the threshold Tb, the indoor fan motor 71 is rotated in the stop period of the compressor motor 1. In contrast, when the difference ΔT is equal to or less than the threshold Tb, the rotation of the indoor fan motor 71 is stopped in the stop period of the compressor motor 1. Thus, when the indoor temperature Ta is sufficiently close to the set temperature Ts, the rotation of the indoor fan motor 71 is stopped in the stop period of the compressor motor 1, and therefore power consumption can be reduced.

Third Embodiment

Figure 14:
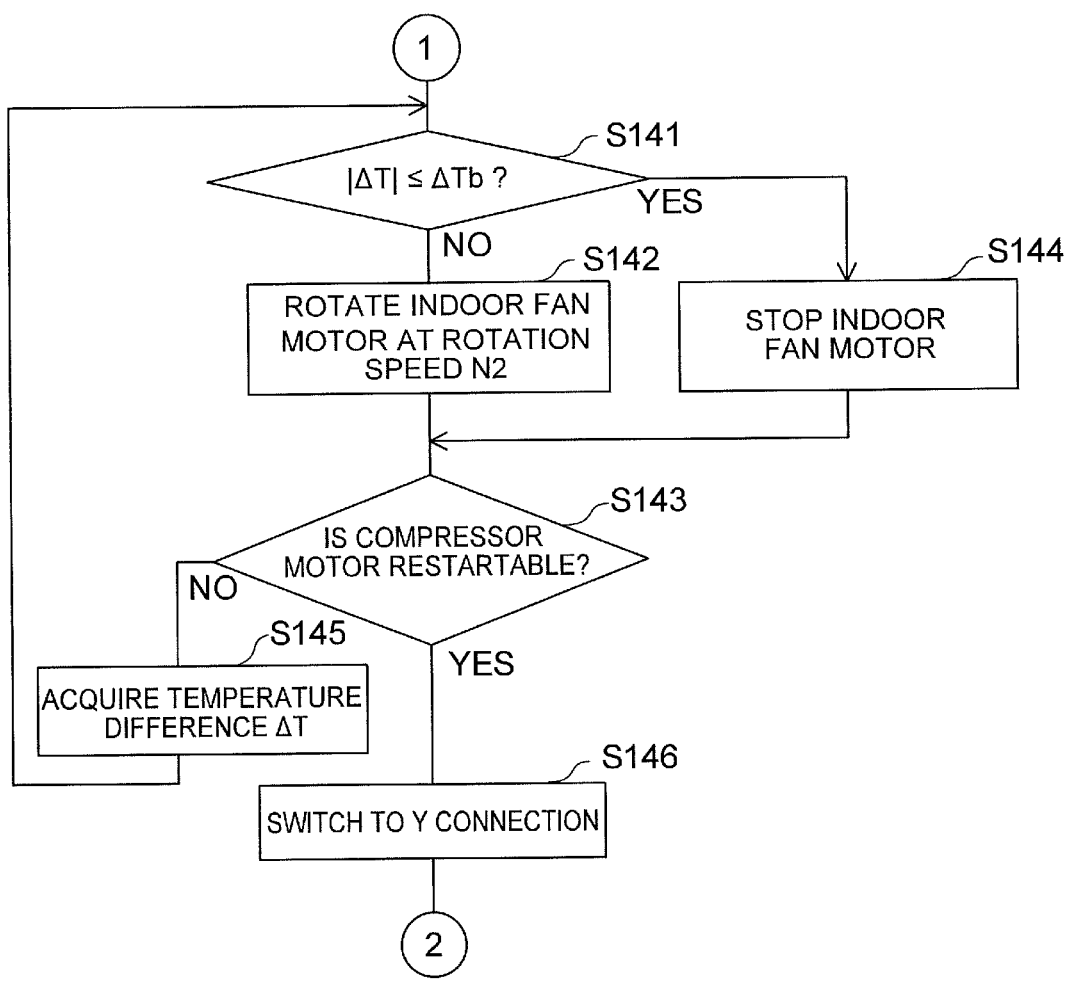
FIG. 14 is a flowchart for explaining a method for controlling an operation of an air conditioner of a third embodiment.

Next, a third embodiment of the present invention will be described. FIG. 14 is a flowchart showing an operation in the third embodiment. Processing shown in FIG. 14 is performed following step S108 in FIG. 10, as is the case with the processing shown in FIGS. 11 and 13.

In the above described second embodiment, when the switching from the delta connection to the Y connection is performed, the threshold Tb is compared with the absolute value of the temperature difference ΔT between the indoor temperature Ta detected by the indoor temperature sensor 54 and the set temperature Ts, and the rotation of the indoor fan motor 71 is stopped when the absolute value of the temperature difference ΔT is equal to or less than the threshold Tb (steps S131 and S135 in FIG. 13). As the temperature difference ΔT, the temperature difference ΔT acquired in step S106 of FIG. 10 is employed.

In contrast, in the third embodiment, the controller 50 continuously acquires the temperature difference ΔT between the indoor temperature Ta detected by the indoor temperature sensor 54 and the set temperature Ts during the stop period of the compressor motor 1 (step S145). Further, the controller 50 compares the temperature difference ΔT with the threshold Tb (step S141). When the absolute value of the temperature difference ΔT is equal to or less than the threshold Tb, the controller 50 stops the rotation of the indoor fan motor 71 (step S144). When the absolute value of the temperature difference ΔT is larger than the threshold Tb, the controller 50 rotates the indoor fan motor 71 at the rotation speed N2 (step S142).

Thereafter, the controller 50 waits until the compressor motor 1 becomes restartable (step S143). Then, the controller 50 switches the connection state of the coils 3 from the delta connection to the Y connection (step S146), and restarts the compressor motor 1 (step S118 in FIG. 10).

The stop period of the compressor motor 1 continues for 60 to 300 minutes, for example, and the indoor temperature may change in the stop period due to the air blowing by the indoor fan 7. In the third embodiment, the indoor temperature Ta is continuously detected by the indoor temperature sensor 54 during the stop period. When the indoor temperature Ta is sufficiently close to the set temperature Ts, the rotation of the indoor fan motor 71 is stopped, but otherwise the indoor fan motor 71 is rotated. Thus, the air blowing operation by the indoor fan 7 can be performed in accordance with change in the indoor temperature in the stop period of the compressor motor 1, and therefore comfort can be increased.

As described above, in the third embodiment, the temperature difference ΔT between the indoor temperature Ta and the set temperature Ts is continuously acquired during the stop period of the compressor motor 1. When the absolute value of the temperature difference ΔT is equal to or less than the threshold Tb, the rotation of the indoor fan motor 71 is stopped, whereas when the absolute value of the temperature difference ΔT is larger than the threshold Tb, the indoor fan motor 71 is rotated. Thus, the air blowing operation of the indoor fan 7 can be performed in accordance with change in the indoor temperature during the stop period of the compressor motor 1. Therefore, comfort can be increased.

Fourth Embodiment

Figure 15:
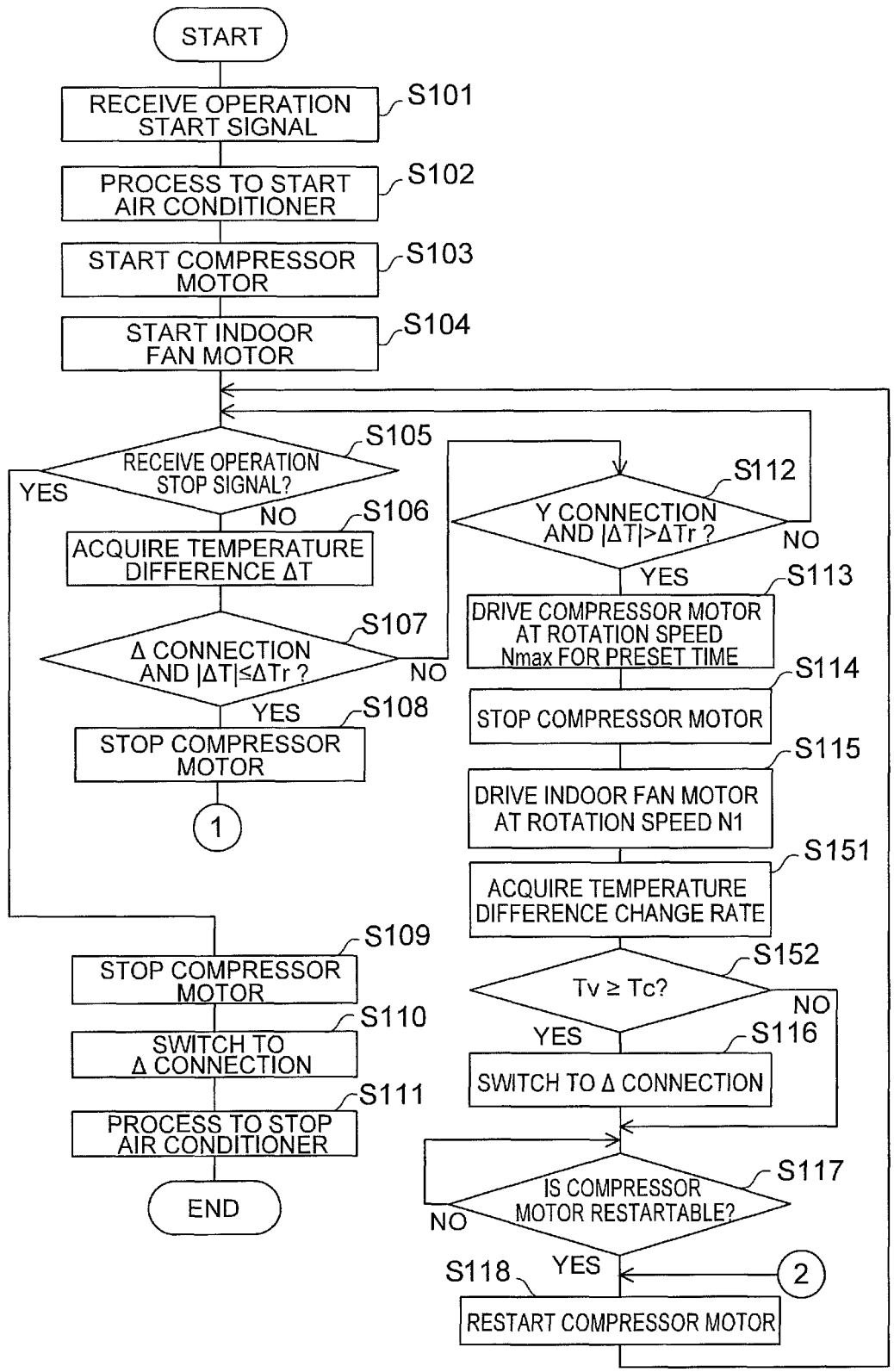
FIG. 15 is a flowchart for explaining a method for controlling an operation of an air conditioner of a fourth embodiment.

Next, a fourth embodiment of the present invention will be described. FIG. 15 is a flowchart showing a method for controlling an operation of an air conditioner in the fourth embodiment. In the flowchart of FIG. 15, steps S151 and step S152 are added between step S115 and step S116 of the flowchart in FIG. 10.

The switching from the Y connection to the delta connection is performed in a state where the air conditioning load increases, such as when outside air flows into the room by opening and closing the window after the indoor temperature Ta approaches the set temperature Ts. However, since the indoor fan 7 blows air in the stop period of the compressor motor 1, the indoor temperature Ta approaches the set temperature Ts and the air conditioning load decreases, and thus the switching to the delta connection may become unnecessary.

Thus, in the fourth embodiment, in the stop period of the compressor motor 1, the indoor fan motor 71 is rotated, and a temperature difference change rate Tv is determined. The temperature difference change rate Tv is a change rate (change rate relative to time) of the absolute value of the difference between the indoor temperature Ta and the set temperature Ts. When the temperature difference change rate Tv is smaller than a specified value (threshold) Tc, the switching to the delta connection is not performed. The temperature difference change rate Tv is defined by the following equation (1). The specified value Tc is a negative value.

$$Tv = \frac{d}{dt}|Ts - Ta| \qquad (1)$$

Specifically, when the switching from the Y connection to the delta connection is performed, the controller 50 stops the rotation of the compressor motor 1 (step S114) and rotates the indoor fan motor 71 at the rotation speed N1 (step S115). Then, the controller 50 acquires the temperature difference change rate Tv (the above described equation (1)) which is the change rate of the absolute value of the difference between the indoor temperature Ta detected by the indoor temperature sensor 54 and the set temperature Ts (step S151).

Then, the controller 50 compares the temperature difference change rate Tv acquired in step S151 with the specified value Tc previously set (step S152). The specified value Tc (<0) is a change rate of the temperature difference (absolute value) when the temperature difference decreases at a pace such that switching to the delta connection is not necessary. The specified value Tc is determined by experiments or the like, and is preset. It is also possible to set different specified values Tc for the heating operation and the cooling operation.

When the temperature difference change rate Tv is equal to or larger than the specified value Tc in step S152, the switching to the delta connection is performed (step S116), waiting is performed until the compressor motor 1 becomes restartable (step S117), and then the compressor motor 1 is restarted (step S118).

In contrast, when the temperature difference change rate Tv is smaller than the specified value Tc in step S152, the controller 50 proceeds to step S117 without performing switching to the delta connection (step S116), waits until the compressor motor 1 becomes restartable, and then the compressor motor 1 is restarted (step S118).

Thus, during the stop period of the compressor motor 1, the connection of the coils is not switched from the Y connection to the delta connection, when the change rate Tv of the absolute value of the difference between the indoor temperature Ta and the set temperature Ts is smaller than the specified value Tc (<0) due to the air blowing by the indoor fan 7 (that is, when the difference between the indoor temperature Ta and the set temperature Ts rapidly decreases). That is, frequent switching of the connection state of the coils 3 can be suppressed, and thus power consumption can be reduced. Steps other than steps S151 and S152 are the same as those in the method for controlling the operation (FIGS. 10 and 11) of the first embodiment.

As described above, in the fourth embodiment, the temperature difference change rate Tv is acquired during the stop period of the compressor motor 1, and whether or not the connection of the coils is to be switched is determined based on the acquired temperature difference change rate Tv. Thus, frequent switching of the connection state of the coils 3 can be suppressed, and power consumption can be reduced.

The second embodiment (FIG. 13) or third embodiment (FIG. 14) may be combined with the fourth embodiment.

Fifth Embodiment

Next, a fifth embodiment of the present invention will be described. In the first embodiment described above, the connection state of the coils 3 is switched between the Y connection and the delta connection. However, the connection state of the coils 3 may be switched between a series connection and a parallel connection.

Figure 16A:
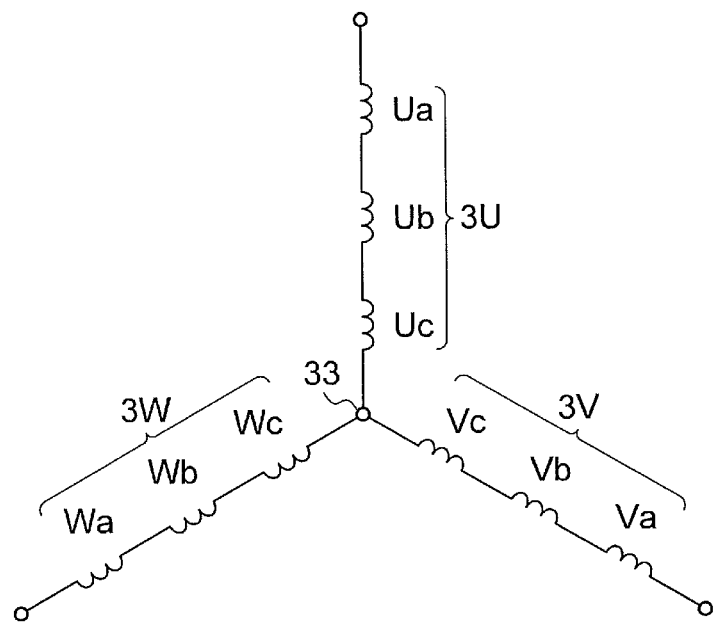
FIGS. 16(A) and 16(B) are schematic diagrams showing a switching operation of a connection state in an air conditioner of a fifth embodiment.
Figure 16B:
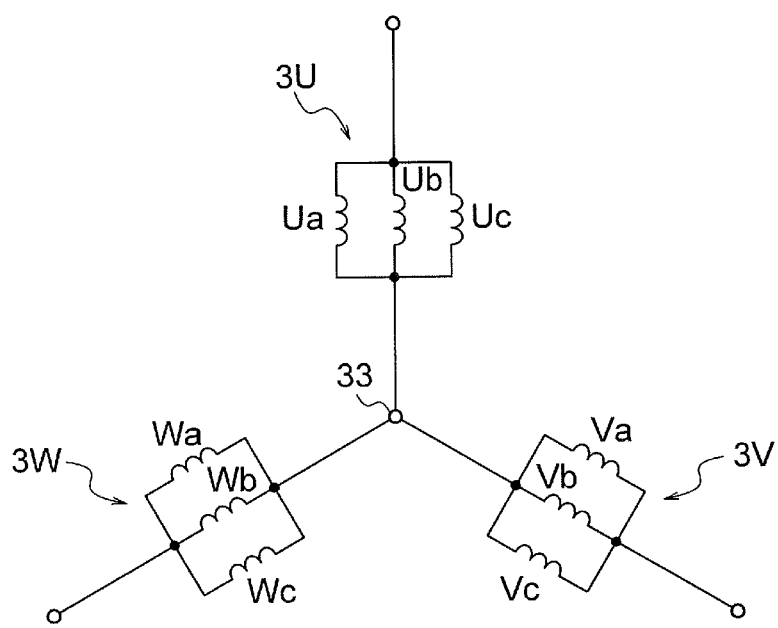

FIGS. 16(A) and 16(B) are schematic diagrams for explaining the switching of the connection state of the coils 3 in the fifth embodiment. As shown in FIG. 16(A), three-phase coils 3U, 3V, and 3W are connected in the Y connection. The coil parts Ua, Ub, and Uc of the coil 3U are connected in series, the coil parts Va, Vb, and Vc of the coil 3V are connected in series, and the coil parts Wa, Wb, and Wc of the coil 3W are connected in series. That is, the coil parts of each phase of the coils 3 are connected in series.

In contrast, as shown in FIG. 16(B), while three-phase coils 3U, 3V, and 3W are connected in the Y connection, the coil parts Ua, Ub, and Uc of the coil 3U are connected in parallel, the coil parts Va, Vb, and Vc of the coil 3V are connected in parallel, and the coil parts Wa, Wb, and Wc of the coil 3W are connected in parallel. That is, the coil parts of each phase of the coils 3 are connected in parallel. Switching of the connection state of the coils 3 shown in FIGS. 16(A) and 16(B) can be achieved, for example, by providing each of the coil parts of the coils 3U, 3V, and 3W with a selector switch.

When n is defined as the number of the coil parts (i.e., the number of columns) connected in parallel in each phase, the line voltage decreases by a factor of 1/n by switching from the series connection (FIG. 16(A)) to the parallel connection (FIG. 16(B)). That is, the motor efficiency can be enhanced by switching the connection states of the coils 3 between two connection states where line voltages are different.

Figure 17A:
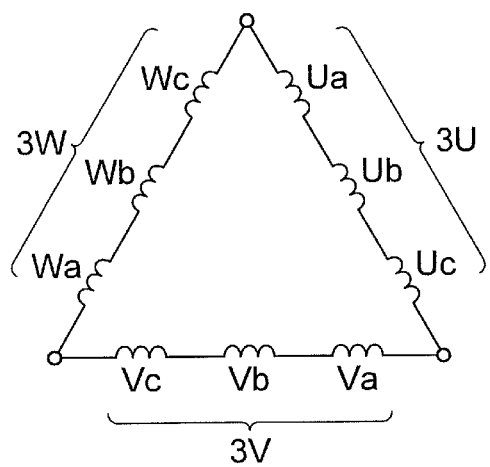
FIGS. 17(A) and 17(B) are schematic diagrams showing another example of the switching operation of the connection state in the air conditioner of the fifth embodiment.
Figure 17B:
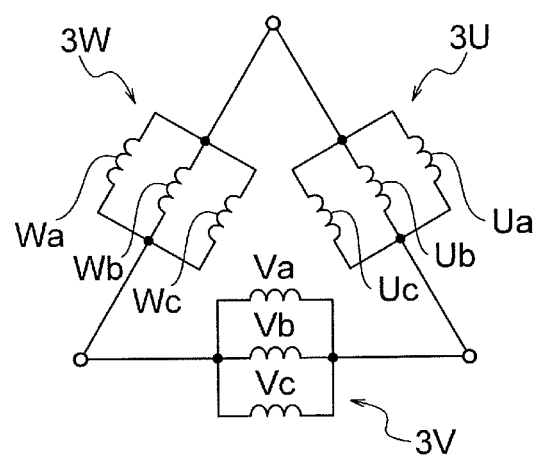

FIGS. 17(A) and 17(B) are schematic diagrams for explaining another configuration example of the fifth embodiment. As shown in FIG. 17(A), three-phase coils 3U, 3V, and 3W are connected in the delta connection. The coil parts Ua, Ub, and Uc of the coil 3U are connected in series, the coil parts Va, Vb, and Vc of the coil 3V are connected in series, and the coil parts Wa, Wb, and Wc of the coil 3W are connected in series. That is, the coil parts of each phase of the coils 3 are connected in series.

As shown in FIG. 17(B), while three-phase coils 3U, 3V, and 3W are connected in the delta connection, the coil parts Ua, Ub, and Uc of the coil 3U are connected in parallel, the coil parts Va, Vb, and Vc of the coil 3V are connected in parallel, and the coil parts Wa, Wb, and Wc of the coil 3W are connected in parallel. That is, the coil parts of each phase of the coils 3 are connected in parallel. Also in this case, the motor efficiency can be enhanced by switching the connection state of the coils 3 between two connection states where line voltages are different.

As described above, in the fifth embodiment, the motor efficiency can be enhanced by switching the connection state of the coils 3 between the series connection and the parallel connection.

At least one of the second embodiment (FIG. 13), the third embodiment (FIG. 14), or the fourth embodiment (FIG. 15) may be combined with the fifth embodiment.

Although in the above described first to fifth embodiments, the connection state of the coils 3 is switched based on the temperature difference ΔT between the indoor temperature Ta detected by the indoor temperature sensor 54 and the threshold Tr, the connection state of the coils 3 may be switched based on, for example, the rotation speed of the compressor motor 1. The rotation speed of the compressor motor 1 can be detected using a current sensor or the like attached to the compressor motor 1. In this regard, since the rotation speed of the compressor motor 1 may vary, the rotation speed of the compressor motor 1 is compared with the reference value, and it is determined whether or not the rotation speed continuously exceeds a reference value for a certain time period.

Although the rotary compressor has been described as an example of the compressor 8 in the above described first to fifth embodiments, the motor of each of the embodiments may be applied to a compressor other than the rotary compressor.

Although the desired embodiments of the present invention have been specifically described, the present invention is not limited to the above described embodiments, and various changes or modifications can be made to the above described embodiments without departing from the scope and spirit of the present invention.

What is claimed is:
1. An air conditioner comprising:
a compressor having a compressor motor including coils;
an indoor fan having a fan motor;
a switch connected to the coils, the switch switching a connection state of the coils between a first connection state and a second connection state in which a line voltage is lower than a line voltage in the first connection state; and
a controller to control the compressor motor, the fan motor, and the switch, the controller providing a stop period during which rotation of the compressor motor stops before the switch switches the connection state of the coils,
wherein the controller causes the fan motor to rotate at a rotation speed N1 in the stop period before the switch switches the connection state from the first connection state to the second connection state,
wherein the controller causes the fan motor to rotate at a rotation speed N2 in the stop period before the switch switches the connection state from the second connection state to the first connection state, the rotation speed N1 and the rotation speed N2 satisfying N1>N2, and
wherein, when the switch switches the connection state of the coils from the first connection state to the second connection state, the controller increases a rotation speed of the compressor motor before stopping the rotation of the compressor motor.

2. The air conditioner according to claim 1, wherein the controller rotates the fan motor before the stop period begins, and the controller causes the fan motor to continue rotation in the stop period.

3. The air conditioner according to claim 1, further comprising:
a temperature sensor to detect an indoor temperature,
wherein the controller performs controls the compressor motor and the switch based on the indoor temperature and a set temperature.

4. The air conditioner according to claim 3, wherein the controller rotates the fan motor in the stop period when the indoor temperature is different from the set temperature.

5. The air conditioner according to claim 3, wherein the controller rotates the fan motor in the stop period when an absolute value of a difference between the indoor temperature and the set temperature is larger than a threshold.

6. The air conditioner according to claim 3, wherein the controller stops rotation of the fan motor in the stop period when an absolute value of a difference between the indoor temperature and the set temperature is equal to or less than a threshold, and
wherein the controller rotates the fan motor in the stop period when an absolute value of the difference between the indoor temperature and the set temperature is larger than the threshold.

7. The air conditioner according to claim 3, wherein the controller does not switch the connection of the coils from the first connection state to the second connection state in the stop period when a change rate of an absolute value of a difference between the indoor temperature and the set temperature is smaller than a prescribed value.

8. The air conditioner according to claim 3, wherein the controller switches the connection state of the coils based on the indoor temperature.

9. The air conditioner according to claim 1, wherein the coils are three-phase coils, and
wherein the first connection state is a state in which the three-phase coils are connected in Y connection, and the second connection state is a state in which the three-phase coils are connected in delta connection.

10. The air conditioner according to claim 1, wherein the coils are three-phase coils that are connected in Y connection or delta connection,
wherein the first connection state is a state in which coil parts of each of the three-phase coils are connected in series, and
wherein the second connection state is a state in which coil parts of each of the three-phase coils are connected in parallel.

11. The air conditioner according to claim 1, wherein the switch is a mechanical switch or a semiconductor switch.

12. The air conditioner according to claim 1, wherein, when the connection state of the coils is switched from the second connection state to the first connection state, the rotation speed of the compressor motor is not increased before stopping the rotation of the compressor motor.

13. A method for controlling an operation of an air conditioner, the air conditioner comprising a compressor having a compressor motor including coils and an indoor fan having a fan motor, the method using a switch connected to the coils and a controller to control the compressor motor, the fan motor, and the switch,
the method comprising:
switching a connection state of the coils using the switch between a first connection state and a second connection state in which a line voltage is lower than a line voltage in the first connection state,
wherein a stop period during which rotation of the compressor motor stops is provided before the step of switching the connection state, and the fan motor is rotated for at least a time period within the stop period,
wherein the fan motor is rotated at a rotation speed N1 in the stop period before the connection state is switched from the first connection state to the second connection state,
wherein the fan motor is rotated at a rotation speed N2 in the stop period before the connection state is switched from the second connection state to the first connection state, the rotation speed N1 and the rotation speed N2 satisfying N1>N2, and
wherein, when the connection state of the coils is switched from the first connection state to the second connection state in the switching step, a rotation speed of the compressor motor is increased before stopping the rotation of the compressor motor.

* * * * *